(12) United States Patent
Haase et al.

(10) Patent No.: US 8,883,037 B2
(45) Date of Patent: Nov. 11, 2014

(54) CHIRAL COMPOUNDS, CHOLESTERIC AND FERROELECTRIC LIQUID CRYSTAL COMPOSITIONS COMPRISING THESE CHIRAL COMPOUNDS, AND LIQUID CRYSTAL DISPLAYS COMPRISING THESE LIQUID CRYSTAL COMPOSITIONS

(71) Applicants: Wolfgang Haase, Reinheim (DE); Artsiom Lapanik, Darmstadt (DE)

(72) Inventors: Wolfgang Haase, Reinheim (DE); Artsiom Lapanik, Darmstadt (DE)

(73) Assignee: Tetragon LC Chemie AG (LI)

( * ) Notice: Subject to any disclaimer, the term of this patent is extended or adjusted under 35 U.S.C. 154(b) by 0 days.

(21) Appl. No.: 13/862,844

(22) Filed: Apr. 15, 2013

(65) Prior Publication Data
US 2013/0228720 A1 Sep. 5, 2013

Related U.S. Application Data

(63) Continuation of application No. 13/119,323, filed as application No. PCT/EP2008/062397 on Sep. 17, 2008, now abandoned.

(51) Int. Cl.
| | | |
|---|---|---|
| *C09K 19/12* | (2006.01) | |
| *C09K 19/52* | (2006.01) | |
| *C09K 19/06* | (2006.01) | |
| *C09K 19/30* | (2006.01) | |
| *C09K 19/00* | (2006.01) | |
| *C07D 239/02* | (2006.01) | |
| *C07D 213/00* | (2006.01) | |
| *C07C 69/76* | (2006.01) | |
| *C07C 69/63* | (2006.01) | |
| *C07C 41/00* | (2006.01) | |
| *C07C 43/02* | (2006.01) | |
| *C07C 43/20* | (2006.01) | |
| *C09K 19/34* | (2006.01) | |
| *C09K 19/04* | (2006.01) | |
| *C09K 19/40* | (2006.01) | |

(52) U.S. Cl.
CPC ............. *C09K 19/3463* (2013.01); *C09K 19/12* (2013.01); *C09K 19/3405* (2013.01); *C09K 19/0403* (2013.01); *C09K 19/404* (2013.01); *C09K 19/3455* (2013.01); *C09K 2019/124* (2013.01); *C09K 19/3003* (2013.01); *C09K 19/3098* (2013.01); *C09K 2019/3025* (2013.01); *C09K 19/3444* (2013.01); *C09K 2019/0444* (2013.01); *C09K 19/126* (2013.01); *C09K 19/3452* (2013.01); *C09K 19/3475* (2013.01)
USPC ............. 252/299.66; 252/299.01; 252/299.6; 252/299.61; 252/299.63; 428/1.1; 544/335; 546/339; 560/59; 560/228; 568/642; 568/643

(58) Field of Classification Search
USPC ............... 252/299.01, 299.6, 299.61, 299.63, 252/299.66; 428/1.1; 544/335; 546/339; 560/59, 228; 568/642, 643
See application file for complete search history.

(56) References Cited

U.S. PATENT DOCUMENTS

| | | |
|---|---|---|
| 4,419,264 A | 12/1983 | Eidenschink et al. |
| 4,780,241 A | 10/1988 | Furukawa et al. |
| 5,250,222 A | 10/1993 | Kelly et al. |
| 5,358,663 A | 10/1994 | Gray et al. |
| 5,382,380 A | 1/1995 | Kurihara et al. |
| 5,486,309 A | 1/1996 | Gray et al. |
| 5,494,605 A | 2/1996 | Kurihara et al. |
| 6,928,271 B2 | 8/2005 | Fish et al. |
| 7,022,259 B2 | 4/2006 | Lee et al. |
| 7,195,719 B1 | 3/2007 | Wand et al. |
| 2007/0070001 A1 | 3/2007 | Martinot-Lagarde et al. |
| 2011/0034738 A1 | 2/2011 | Pauluth et al. |

FOREIGN PATENT DOCUMENTS

| | | |
|---|---|---|
| EP | 0306195 A2 | 3/1989 |
| EP | 0329153 A2 | 8/1989 |
| EP | 0339414 A2 | 11/1989 |
| EP | 0360042 A1 | 3/1990 |
| EP | 1346995 A1 | 9/2003 |
| GB | 2200912 A | 8/1988 |
| WO | WO-89/02425 A1 | 3/1989 |
| WO | WO-96/00710 A1 | 1/1996 |
| WO | WO-2004/104980 A2 | 12/2004 |

*Primary Examiner* — Geraldina Visconti
(74) *Attorney, Agent, or Firm* — Drinker Biddle & Reath LLP

(57) ABSTRACT

Chiral liquid crystal compounds of the general formula (1):

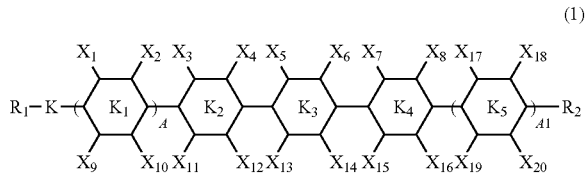

(1)

in which at least one of $R_1$ and $R_2$ is a chiral substituent, K may be a single bond or the same as $K_{1-5}$ and $K_{1-5}$ denote a six-membered ring system which rings may be at least partially unsaturated, wherein the number of atoms in these rings or ring systems between the two atoms forming a part of the link to the next ring, or to one of the substituents $R_1$ and $R_2$, does not differ by more than one if counted in the clockwise, and in the counter-clockwise sense, starting from the same atom in each case, $X_{1-20}$ denote alkyl, or alkoxy, or fluorinated alkyl, or fluorinated alkoxy groups, or atom H, or halogen atoms, mixtures comprising such chiral liquid crystal compounds, and liquid crystal displays comprising such mixtures as active ingredients.

27 Claims, No Drawings

CHIRAL COMPOUNDS, CHOLESTERIC AND FERROELECTRIC LIQUID CRYSTAL COMPOSITIONS COMPRISING THESE CHIRAL COMPOUNDS, AND LIQUID CRYSTAL DISPLAYS COMPRISING THESE LIQUID CRYSTAL COMPOSITIONS

RELATED APPLICATIONS

This application is a continuation application of U.S. patent application Ser. No. 13/119,323, filed Jun. 6, 2011, which is a national stage application (under 35 U.S.C. §371) of PCT/EP2008/062397, filed Sep. 17, 2008.

FIELD OF THE INVENTION

The present invention relates to chiral compounds, ferroelectric liquid crystal compositions and mechanical and shock-stable ferroelectric liquid crystal displays (LCDs) comprising such ferroelectric liquid crystal compositions, as well as cholesteric liquid crystal compositions and fast switching, low operating voltage and monostable or bistable cholesteric LCDs with passive matrix (static or multiplexing) or active matrix (TFT) addressing comprising such cholesteric liquid crystal compositions.

BACKGROUND OF THE INVENTION

Ferroelectric and other chiral liquid crystal compounds have been disclosed in WO 96/00710 A1, EP 0 339 414 A2, EP 0 360 042 A1, EP 0 306 195 A2, GB 2 200 912 A, U.S. Pat. No. 7,022,259, U.S. Pat. No. 5,494,605, U.S. Pat. No. 5,382,380, U.S. Pat. No. 5,250,222, U.S. Pat. No. 4,419,264, WO 89/02425 A1, EP 0 329 153 A2, U.S. Pat. No. 5,486,309 A, U.S. Pat. No. 5,358,663 A and U.S. Pat. No. 4,780,241.

However, the compounds of the prior art are not yet fully satisfactory and do not meet all of the requirements for the applications in ferroelectric and cholesteric liquid crystalline displays as mentioned supra. Especially, compounds are needed that will allow the production of shock-stable ferroelectric liquid crystal displays as well as at the same time fast switching, low operating voltage monostable or bistable chiral nematic LCDs. In the context of the present invention, it is understood that the designations "cholesteric" and "chiral nematic" are deemed equivalent.

In U.S. Pat. No. 4,419,264, a few nonchiral fluorine-containing 4,4-bis-(cyclohexyl)-biphenyl derivatives are disclosed which can be used as the components of nematic liquid crystal mixtures (examples 3 to 5). While it is mentioned that $R_1$ or $R2_1$ can be branched (and therefore chiral), there is no information about such chiral compounds, their properties and the properties of the liquid crystal mixtures based upon them. It is clear from the description of U.S. Pat. No. 4,419,264 that these compounds cannot be used for the preparation of cholesteric liquid crystal mixtures with a wide temperature range of the cholesteric phase (from −30° C. up to 100° C.), good dynamic parameters (with a response time of less than 5 ms or 10 ms), low threshold and saturation voltages (less than 20 V), good sharpness of the electro-optical curve, and good mechanical, thermal and long-term stability of bistable textures, and of ferroelectric liquid crystal mixtures with different values of the optical anisotropy (Δn) and the spontaneous polarisation, or chiral nematic mixtures with different values of a helical pitch and an optical anisotropy (Δn), a positive or negative dielectric anisotropy (Δ∈), a needed value of the elastic constants (especially $K_{22}$) and a wide temperature range of the ferroelectric or cholesteric phases.

The compounds and liquid crystal mixtures of U.S. Pat. No. 4,419,264 do not allow in combination with alignment materials to create shock-stable ferroelectric liquid crystal displays LCDs with low operating voltage and high contrast ratio, or fast switching, low operating voltage monostable or bistable chiral nematic LCDs.

And finally, the chiral compounds of U.S. Pat. No. 4,419,264 cannot be really used for the practical application. The synthetic routes to such compounds, in contrast to the compounds of present invention and the non-chiral compounds of U.S. Pat. No. 4,419,264, are multistage and the final yield of these compounds is very low. Additionally, it should be noted that the starting materials: chiral 4-alkylcyclohexanones, the Grignard reagents etc. are very difficult to prepare.

In WO 89/02425 A1, only a few chiral fluorine-containing terphenyls and nonchiral quaterphenyls are disclosed, which compounds can be used as components of ferroelectric liquid crystal mixtures (see examples 12 and 13, and 14 to 24). There is no information about chiral quaterphenyls, their properties and the properties of the liquid crystal mixtures based upon them.

In EP 0 329 153 A2 and in WO 96/00710 A1, lactic derivatives and chiral cyclohexyl derivatives are disclosed which are different from compounds of formula (1), form liquid crystal phases only in a narrow temperature range, and which have properties which do not allow to use them for the preparation of cholesteric liquid crystal mixtures with a wide usable temperature range of the cholesteric phase (from −30° C. up to 100° C.), good dynamic parameters (with a response time of less than 5 ms or 10 ms), low threshold and saturation voltages (less than 20 V), good sharpness of the electro-optical curve, and good mechanical, thermal and long-term stability of bistable textures, and of ferroelectric liquid crystal mixtures with different values of the optical anisotropy (Δn) and the spontaneous polarisation, or chiral nematic mixtures with different values of a helical pitch and an optical anisotropy (Δn), a positive or negative dielectric anisotropy (Δ∈), a needed value of the elastic constants (especially $K_{22}$) and a wide temperature range of the ferroelectric or cholesteric phases.

The compounds and liquid crystal mixtures of EP 0 329 153 A2 and WO 96/00710 A1 do not allow in combination with alignment materials to create the shock-stable ferroelectric liquid crystal displays (LCDs) of this invention with low operating voltage and high contrast ratio, or fast switching, low operating voltage monostable or bistable chiral nematic LCDs.

Similarly, in U.S. Pat. No. 5,494,605 A, U.S. Pat. No. 5,382,380 A, EP 0 360 042 A1, GB 2 200 912 A, EP 0 306 195 A2, U.S. Pat. No. 5,486,309 A, and U.S. Pat. No. 5,358,663 A, chiral terphenyls, 2,5-diphenyl-pyridines and other compounds are disclosed, which do not fall under the general formula (1).

4-Pentyl-3"-chloro-4'''-(2-methylbutyloxy)quaterphenyl described before forms Sm C* phase at high temperature and in a narrow temperature range and has a low spontaneous polarisation, which does not allow to use this compound for the preparation of shock-stable ferroelectric liquid crystal displays LCDs with low operating voltage, high contrast ratio and a wide temperature range of Sm C* phase.

For the reasons given above, the chiral esters of 4-decyloxy-3"-methyl-4"-quaterphenyl carboxylic acid as described therein cannot be used for the preparation of shock-stable ferroelectric liquid crystal displays (LCDs) with low operating voltage, high contrast ratio and a wide temperature range of Sm C* phase. These compounds do not form a Sm C* phase. And additionally, the synthetic routes to these compounds, in contrast to those leading to the compounds of present invention are multistage, and preparation and purification of the intermediate, 4-decyloxy-3"-methyl-4'''-quaterphenyl carboxylic acid and the final products are complicated to make.

It should be noted that the chiral compounds of WO 96/00710 A1, EP 0 339 414 A2, EP 0 360 042 A1, EP 0 306 195 A2, GB 2 200 912 A, U.S. Pat. No. 7,022,259, U.S. Pat. No. 5,494,605, U.S. Pat. No. 5,382,380, U.S. Pat. No. 5,250,222, U.S. Pat. No. 4,419,264, WO 89/02425 A1, EP 0 329 153 A2, U.S. Pat. No. 5,494,605 A, U.S. Pat. No. 5,486,309 A, U.S. Pat. No. 5,358,663 A and U.S. Pat. No. 4,780,241, opposite to the compounds of formula (I), do not have a such rigid rod shape central core of the molecules and do not form the smectic C phase in the overall temperature range of from 10° C. to 154° C. These compounds are characterised by the conformation changes of the fragments of the molecules, and the strong dependence of these changes upon the temperature, pressure etc., which do not allow to use them for the preparation of shock-stable ferroelectric or monostable or bistable chiral nematic LCDs with low operating voltage and high contrast ratio.

Low power consumption, fast response time as well as pixel bistability, when the devices have two or more stable states without field, are further desirable attributes for LCDs. Bistable chiral nematic devices such as those described in U.S. Pat. No. 6,928,271 B2, and WO 2004/104980 A2 can be driven line-by-line—once displayed—the information is stored while updating the rest of the screen, and simple matrix addressing may be employed.

However, well-known chiral compounds do not allow to obtain liquid crystal mixtures with a wide usable temperature range of the cholesteric phase (from −30° C. up to 100° C.), good dynamic parameters (with a response time of less than 5 ms or 10 ms), low threshold and saturation voltages (less than 20 V), good sharpness of the electro-optical curve, and good mechanical, thermal and long-term stability of bistable textures.

Ferroelectric liquid crystals (FLCs) are also interesting candidates for active materials in future display devices. FLCs exhibit a fast response, a wide viewing angle and bistable memory capability and have been considered for light shutter and display applications. Ferroelectric liquid crystals displays (FLCDs) are characterised by high-speed operation, in-plane switching and ultra-high resolution.

However, technical issues on the zig-zag defects, mechanical stability and DC voltage balance still hinder FLCDs from widespread applications. The zig-zag defects tend to deteriorate the electro-optic (EO) properties of the devices, while the mechanical and shock-sensitive FLC alignment and residual voltage would cause concerns for long-term stability. It is hard to fabricate defect-free FLCDs owing to the appearance of the zig-zag defect that degrades memory capability and contrast ratio of the display (S. T. Lagerwall, Ferroelectric and Antiferroelectric Liquid Crystals, Wiley-VCH, Weinheim and New York, 1999)

There are other problems with FLCDs, including high driving voltages (from 20 V to 40 V), a low cell gap (under 2 μm), no greyscale, a paucity of stable, room-temperature materials, and wide temperature range materials, and structural defects in the display cells which result from thermal and mechanical stress because of non-optimised FLC materials and alignment conditions.

SUMMARY OF THE INVENTION

The present invention overcomes the problems of the prior art by providing chiral compounds that exhibit a low temperature transition from the crystalline to smectic B, or C*, or A, or cholesteric phases, and that exhibit the liquid crystal smectic and chiral nematic (=cholesteric) phases over wide temperature ranges. These compounds have a rigid rod shape central core of the molecules and they are characterised by weak dependence conformation changes of the fragments of the molecules upon the temperature, pressure etc., which allow to use them for the preparation of shock-stable ferroelectric or monostable or bistable chiral nematic LCDs with low operating voltage and high contrast ratio.

It is another object of the invention to provide cholesteric and ferroelectric liquid crystal mixtures, forming cholesteric or smectic C* phases over broad temperature ranges and at low temperature.

A further object of the invention is to provide a fast switching, low operating voltage monostable or bistable cholesteric liquid crystal display as well as a shock-stable ferroelectric liquid crystal display, which can be operated over a wide range of temperatures and already at very low temperatures.

These objects were achieved by providing the rigid central core polyring chiral liquid crystal compounds of the general formula (1):

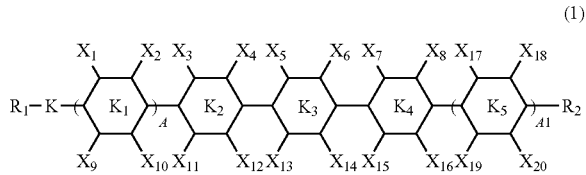

(1)

in which
$R_1$=Y—$(CH_2)_n$—$(O)_m$—$(CH_2)_k$—$(O)_l$—$(CH_2)_p$—, or
Y—$(CH_2)_n$—CH=CH—$(CH_2)_p$—$(O)_m$—, or
Y—$(CH_2)_n$—$CHY_1$—$(O)_m$—$(CH_2)_k$—$(O)_l$—$CHY_2$—$(CH_2)_p$—$Y_3$, or
Y—$(CH_2)_n$—$CHY_1$—$(O)_m$—$(CH_2)_k$—$(O)_l$—$(CH_2)_p$—$Y_3$, or
fluorinated alkyl or fluorinated alkoxy groups where the fluorinated alkyl or fluorinated alkoxy group has from 1 to 20 carbon atoms;
$R_2$=$Y_3$—$(CH_2)_n$—$CHY_4$—$(O)_m$—$(CH_2)_k$—$(O)_l$—$CHY_5$—$(CH_2)_p$—Y, or
$Y_3$—$(CH_2)_n$—$(O)_m$—$(CH_2)_k$—$(O)_l$—$CHY_5$—$(CH_2)_p$—Y,
where
Y denotes, in each occurrence, and independently of each other, one of the atoms H, F, and Cl, or one of the groups —CN, —S—CN, —O—$CF_3$, —$CF_3$, —CO—$CH_3$, —$C_iH_{2i+1}$, —CO—O—$C_iH_{2i+1}$, or —O—CO—$C_iH_{2i+1}$;
$Y_1$, $Y_2$ denote, in each occurrence, and independently of each other, one of the atoms F and Cl or one of the groups —CN, —$CF_3$, —$C_jH_{2j+1}$, —O—$C_jH_{2j+1}$, —CO—O—$C_jH_{2j+1}$, —O—CO—$C_jH_{2j+1}$ or nonsimultaneously the atom H, or simultaneously the atom H, if $R_2$ is a chiral substituent;
$Y_3$ denotes in each occurrence, and independently of each other, one of a single bond or the atom —O—, $Y_4, Y_5$ denote, in each occurrence, and independently of each other, one of the atoms F, Cl or one of the groups —CN, —$CF_3$, —$C_nH_{2h+1}$, —O—$C_nH_{2h+1}$, —CO—O—$C_nH_{2h+i}$, —O—CO—$C_nH_{2h+1}$ or nonsimultaneously the atom H, or simultaneously the atom H, when $R_1$ is a chiral substituent;

n, p, k, j, i, h each assume values, independently for each of n, p, k, j, i, and h, from 0 to 7;

m, l independently denote 0 or 1; and if l=m=0, then i+k+n+p is at least 6 with the proviso that Y, $Y_1, Y_2, Y_3, Y_4, Y_5$, h, i, j, k, l, m, n, and p are chosen such that at least one of $R_1$ and $R_2$ is a chiral substituent having at least one center of chirality, K denotes a single bond or a six-membered ring system selected from the group consisting of cyclohexane, cyclohexene, benzene, pyridine, pyrimidine, tetrazine, 1,3,2-dioxaborinane, hexahydropyridine, hexahydropyrimidine, hexahydropyridazine, hexahydropyrazine, the isomers of hexahydrotriazine, tetrahydrooxazine, cyclobutane, cyclopentane, cycloheptane, and cyclooctane rings, and from at least partially unsaturated ring compounds derived from any of these ring compounds, wherein the number of atoms in these rings or ring systems between the two atoms forming a part of the chemical bond to the next ring, or to the substituent $R_1$ does not differ by more than one if counted in the clockwise, and if counted in the counter-clockwise sense, starting from the same atom in each case;

where A, $A_1$ assume value 0 or 1, and in the case when K is single bond, only one of A and $A_1$ is 0, $K_{1-5}$ independently of each other denote each a six-membered ring system selected from the group consisting of benzene, pyridine, pyrimidine, tetrazine, 1,3,2-dioxaborinane, hexahydropyridine, hexahydropyrimidine, hexahydropyridazine, hexahydropyrazine, the isomers of hexahydrotriazine, tetrahydrooxazine, and of the at least partially unsaturated ring compounds derived from any of these ring compounds, $X_{1-20}$ denote, independently of each other, alkyl, or alkoxy, or fluorinated alkyl, or fluorinated alkoxy groups, or the atom H, or one of the halogen atoms, or one of the alkyl, alkoxy, fluorinated alkyl, and fluorinated alkoxy groups having, in each case independently of each other, from 1 to 20 carbon atoms, and wherein at least three consecutive rings of the rings from $K_1, K_2, K_3, K_4$ and $K_5$ are aromatic or heteroaromatic rings selected independently from each other from the group of rings consisting of benzene, pyridine, pyrimidine, and tetrazine, consecutive rings meaning rings that are directly bonded to each other, with one atom which is a member of the one ring $K_g$ being directly bonded to one atom which is a member of the adjacent ring $K_{q-1}$ or $K_{q+1}$, where q is an integer from 2 to 4.

DETAILED DESCRIPTION OF THE PREFERRED EMBODIMENTS

It has been found that those compounds which are except from formula 1 have worse performance with regard to shock-free properties (the contrast ratio of LCD cells comprising those molecules which are excepted show a strong decline in contrast ratio upon geometrical deviation).

In another preferred embodiment of this invention, one or more of the six-membered rings K and $K_{1-5}$ may be replaced by a ring system selected from the group consisting of four-membered rings, which in turn are selected from the group consisting of cyclobutane, oxetane, from five-membered rings selected from the group consisting of cyclopentane, cyclopentene, pyrrolidine, imidazolidine, tetrahydrofurane, from dicyclopentane, from perhydroazulene, from seven-membered rings selected in turn from the group consisting of cycloheptane, cycloheptene, oxepane, dioxepane, azepane, diazepane, and from eight-membered rings selected in turn from the group consisting of cyclooctane, cyclooctene, and eight-membered heterocyclic rings wherein at least one carbon atom is substituted by a nitrogen or an oxygen atom, and from at least partially unsaturated ring compounds derived from any of these ring compounds mentioned hereinbefore, wherein the number of atoms in these rings or ring systems between the two atoms forming a part of the link to the next ring, or to one of the substituents $R_1$ and $R_2$, does not differ by more than one if counted in the clockwise, and in the counter-clockwise sense, starting from the same atom in each case. In this preferred embodiment, the substituents X are chosen in a way that the number of substituents in each ring having from 4 to 8 ring atoms is adjusted to the number of atoms in that said ring that can carry at least one substituent, and which are not bonded directly, or via a linking group, to the adjacent ring.

It is further preferred that at least one ring atom in at least one of the rings K and $K_1$ to $K_5$ carries a substituent (any atom or group of atoms other than a hydrogen atom).

Preferably, the six-membered rings are connected in the 1,4-position, and the compounds of formula (1) are represented by one of the formulae 1.1 to 1.7 and 1.14 to 1.17 set forth below

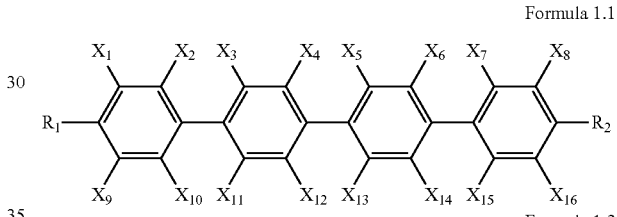

Formula 1.1

Formula 1.2

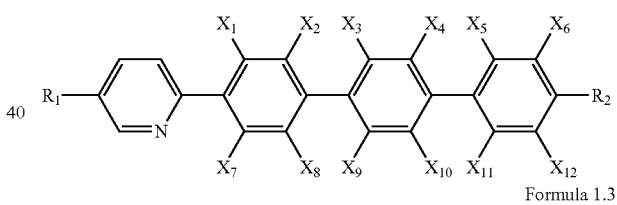

Formula 1.3

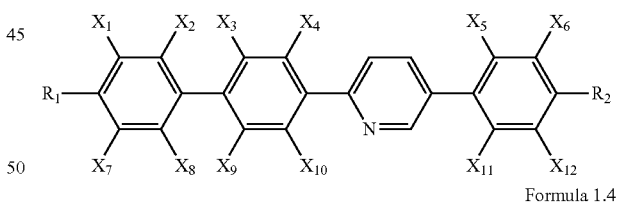

Formula 1.4

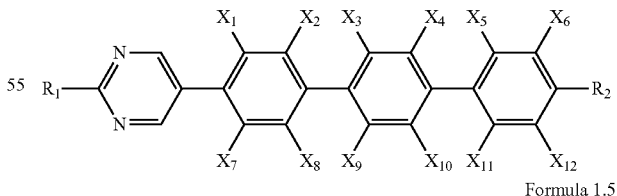

Formula 1.5

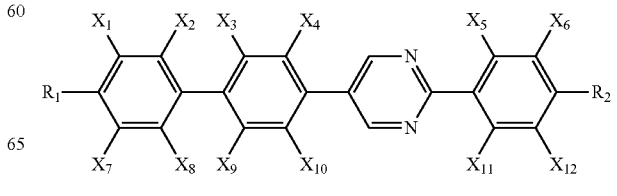

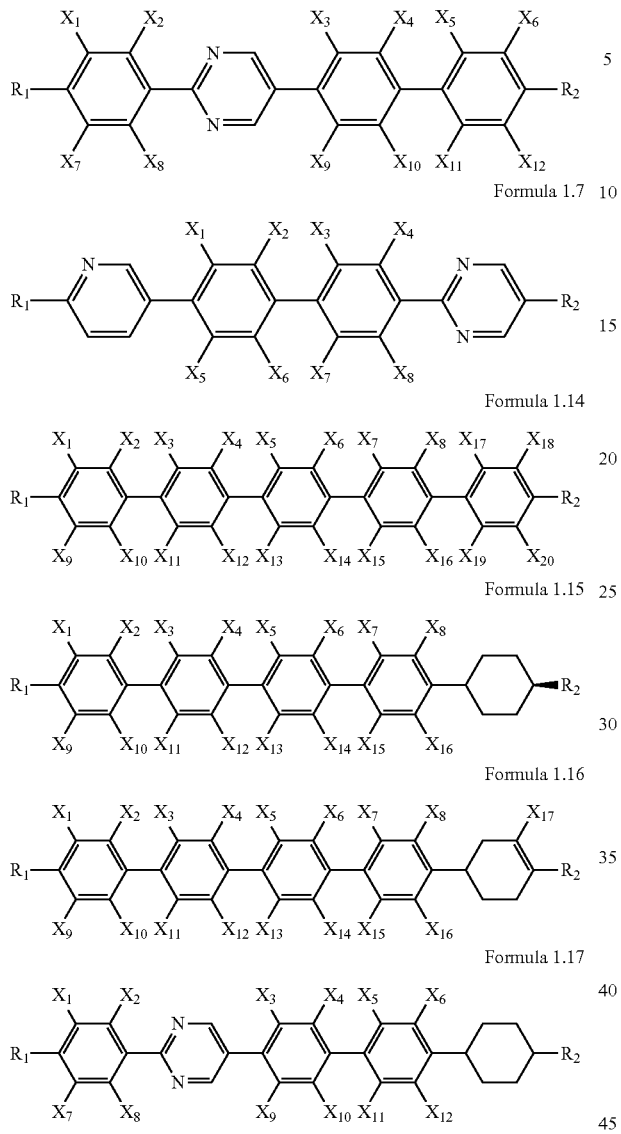

where the substituents $X_1$ to $X_{20}$ are as defined in the explanation of formula 1 supra.

Cholesteric, or chiral nematic liquid crystal mixtures according to the present invention contain at least two liquid crystal compounds and at least one of them is a compound of the general formula (1) supra, and optionally, one of them or more than one of them is a non-chiral or non-cholesteric liquid crystal compound.

Molecules which are not represented by formula (1) have proven in the experiments underlying the present invention to have worse performance, in combination with the said at least one non-chiral or non-cholesteric liquid crystal compounds, with regard to shock-free properties as explained supra.

Ferroelectric liquid crystalline mixtures according to the present invention contain at least two liquid crystal compounds and at least one of them is a compound of the general formula (1) supra, and optionally, one of them or more than one of them is a chiral or non-chiral smectic liquid crystal compound.

Particularly good results have been obtained for molecules of formula (1) wherein

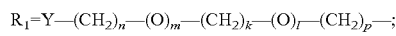

n assumes values from 3 to 7
K denotes a single bond
A=1,
$K_{1-5}$ denote, independently from each other, a benzene, or pyridine, or pyrimidine ring,
$X_{1-20}$ denote, independently from each other, one of the —$CH_3$, —$C_2H_5$, —O—$CH_3$, —$CF_3$, and —O—$CF_3$ groups, or one of the atoms H, F, and Cl, or wherein

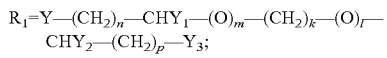

K denotes a single bond,
A=1, $A_1$ assumes a value of 0 or 1;
$K_{1-5}$ denote, independently from each other, a benzene, or pyridine, or pyrimidine ring, and
$X_{1-20}$ denote —$CH_3$, or —$C_2H_5$, or —O—$CH_3$, or —$CF_3$, or —O—$CF_3$ groups, or an atom H, or F, or Cl, or wherein

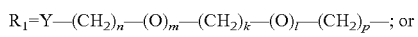

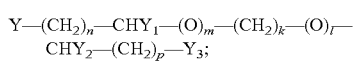

K denotes one of benzene, pyridine, pyrimidine, cyclobutane, cyclopentane, cycloheptane, and cyclooctane rings;
A=1, $A_1$=0;
$K_{1-4}$ denote benzene, or pyridine, or pyrimidine ring, except the case when $K_1$ and $K_3$ are benzene rings;
$X_{1-16}$ denote, independently from each other, one of the groups —$CH_3$, —$C_2H_5$, —O—$CH_3$, —$CF_3$, and —O—$CF_3$, or one of the atoms H, F, and Cl, or wherein

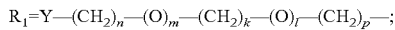

n assumes values of from 3 to 7,
K denotes a single bond,
A=1, $A_1$=0;
$K_{1-5}$ denote, independently from each other, a benzene, or pyridine, or pyrimidine ring;
$X_{1-16}$ denote, independently from each other, an atom H and not more than seven of $X_{1-16}$ may be halogen atoms, or —$CH_3$, or —$CF_3$ groups, or wherein
at least three, more preferably at least four, consecutive rings in formula (1) are phenylene rings which are connected in the 1- and 4-positions to the adjacent ring or bond, or wherein
$R_2$ is a chiral substituent, and $R_1$ is a non-chiral linear or branched alkyl residue having from 6 to 25 carbon atoms, preferably between 7 and 24 carbon atoms, more preferred between 8 and 23 carbon atoms, still more preferred between 9 and 22 carbon atoms, and particularly preferred, between 10 and 21 carbon atoms, or wherein
there are four or five phenylene rings each connected in the 1- and 4-positions, or wherein
the alkyl residue $R_1$ is directly connected with one of its carbon atoms to the outer phenylene ring in the para position, or wherein
the outer of the consecutive rings, i.e. those rings that carry the substituents $R_1$— or $R_1$—K—, and $R_2$—, respectively, do not carry substituents in the 2, 3, 5, and 6 positions, or wherein
in a number of g consecutive rings, the rings being referred to as K, $K_1$, $K_2$, $K_3$, ..., $K_{g-1}$, for any ring $K_f$ where f can assume values from 0 in which case $K_f$=K, 1 in which case $K_f=K_1$, 2 in which case $K_f=K_2$, etc., up to g−1 in which case $K_f=K_{g-1}$, if two rings $K_{f1}$ and $K_{f2}$ with f2>f1 bear a substituent in the 2, 3, 5, or 6 position, there is no ring $K_f$ with f2>f>f1 which does not also bear at least one substituent in the 2, 3, 5, or 6 position, in other words, there is no unsubstituted ring between any two substituted rings, or wherein the at least one chiral centre in the group $R_2$ is separated from the ring $K_4$ or $K_5$ by one ether bond —O— or a non-chiral alkylene group —$CY_6Y_6$—, or a non-chiral group of the formula —O—$CY_6Y_6$—, or a group of the formula —$CH_2$—$CY_6Y_6$—, or a non-chiral group of the formula —$CY_6Y_6$—$CH_2$—, or a non-chiral group of the formula —O—$CY_6Y_6$—$CH_2$— where $Y_6$ may be H, F, Cl, —CN, $CF_3$, —$C_qH_{2q+1}$, —O—$C_qH_{2q+1}$, —CO—O—$C_qH_{2q+1}$, where q can be from 1 to 11.

Particularly improved results were obtained if two or more of these preferred conditions were applied in the selection of molecules.

Liquid crystal compounds according to the present invention were synthesised by the reactions of 3,6-disubstituted cyclohex-2-enones or 2,5-disubstituted cyclohexanones (V. S. Bezborodov et al., Liquid Crystals, 23, 69-75 (1997); V. S. Bezborodov et al., Liquid Crystals, 28, 1755-1760 (2001) with phosphorous pentachloride, sodium borohydride, (diethylamino)sulphur trifluoride (DAST), other chemical reagents, or by the Grignard reaction with methyl magnesium iodide and then by the transformations of the prepared intermediates in the standard ways (V. S. Bezborodov et al., Mol. Cryst. Liq. Cryst., 299, 1 (1997) accordingly to the synthetic Schemes 1 and 2, or by the cross-coupling (Suzuki) reaction (A. Suzuki, J. Organometallic Chem., 576, 147 (1999)) of the corresponding substituted bromo substituted biphenyls or terphenyls, or substituted pyridines, or pyrimidines with corresponding arylboronic acids.

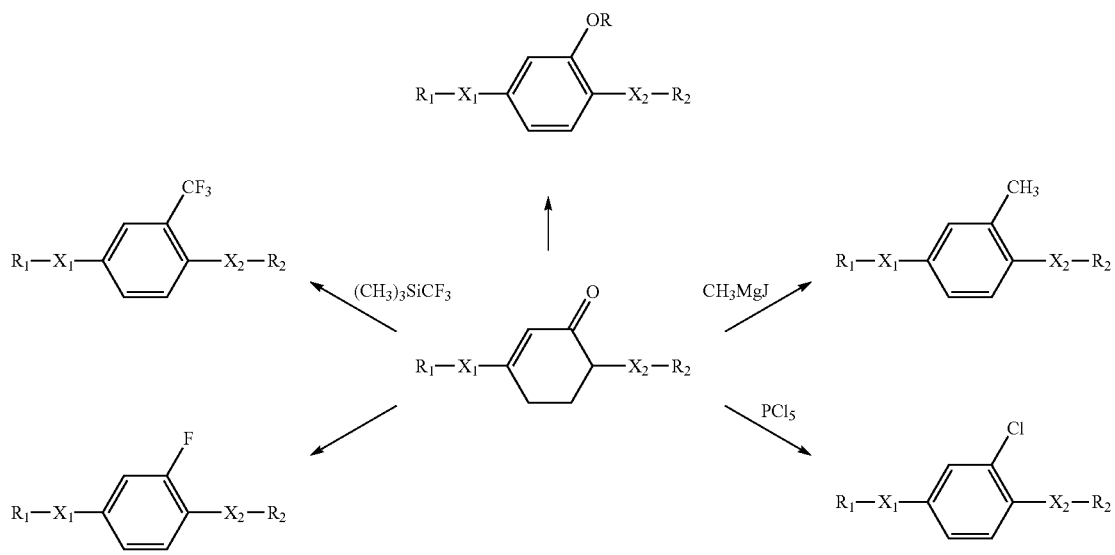

Scheme 1

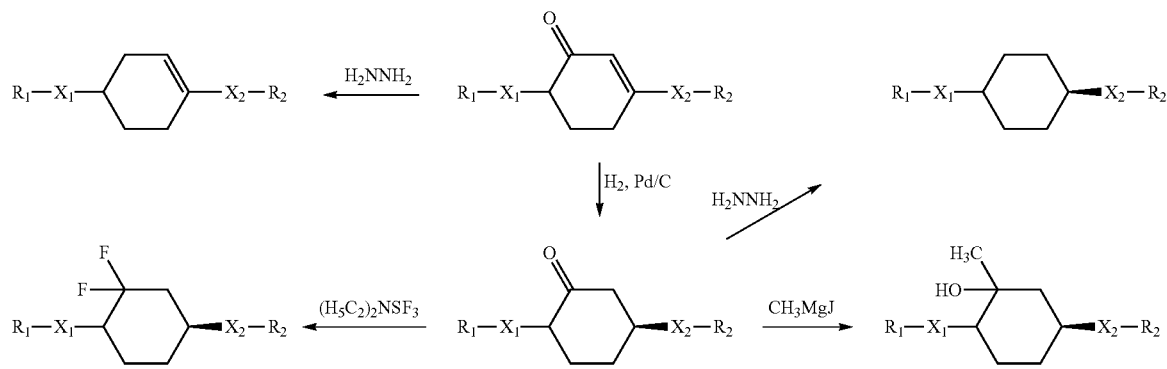

Scheme 2

-continued

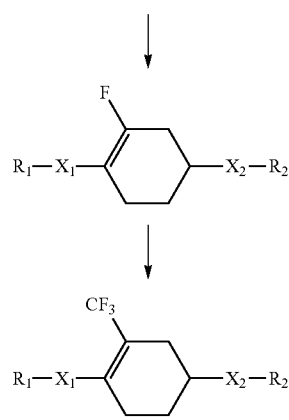

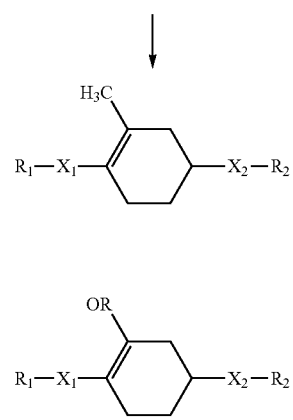

Many compounds according to the present invention show better parameters for some application than compounds known in the prior art.

Liquid crystal compounds of formula (1) according to the present invention make it possible to create new ferroelectric LC mixtures with different values of the optical anisotropy ($\Delta n$) and the spontaneous polarisation, or chiral nematic mixtures with different values of a helical pitch and an optical anisotropy ($\Delta n$), a positive or negative dielectric anisotropy ($\Delta \varepsilon$), a needed value of the elastic constants (especially $K_{22}$) and a wide temperature range of the ferroelectric or cholesteric phases. These mixtures allow in combination with alignment materials to create new shock-stable ferroelectric liquid crystal displays LCDs with low operating voltage and high contrast ratio, or new mode (effect) fast switching, low operating voltage monostable or bistable chiral nematic LCDs with passive matrix (static or multiplexing) or active matrix (TFT) addressing.

Particularly good results have been obtained when at least three, more preferably at least four, consecutive rings in formula 1 are phenylene rings which are connected in the 1- and 4-positions to the adjacent ring, or bond. Particularly preferred are such compounds (quaterphenyl derivatives) which have exactly four phenylene rings connected in the 1- and 4-positions. It has been found that with four para-phenylene rings in immediate succession, i.e. adjacent to each other, the best compromise between viscosity and switching time and width of the useful temperature range is obtained. It is further preferred that one of the residues, $R_1$, is a chiral substituent, and at the same time, the other residue, $R_2$, is a non-chiral linear or branched, preferably linear, alkyl substituent having from 6 to 25 carbon atoms, preferably from 8 to 23 carbon atoms, and particularly preferably from 9 to 22 carbon atoms. Particularly, the alkyl residue must be directly connected to the outer phenylene ring in the para position to yield the best results. This asymmetric substitution has proved to be very promising with regard to the low influence of mechanical pressure upon the contrast ratio in a LCD cell, and also switching times.

The present invention is described in more detail by the examples 1 to 48 and the data presented in tables 1 to 9.

However, these examples do not limit the scope of the present invention. In these examples, all quantities measured in "%" are mass fractions of the substance in question, i.e. the ratio of the mass of that substance to the mass of the mixture. A concentration stated in "%" is the ratio of the mass (in g) of the solute or substance in question present in the solution or mixture, and an amount of 100 g of the solution or mixture.

Intermediate 1

6-(4-Methoxyphenyl)-3-(trans-4-heptycyclohexylphenyl)-cyclohex-2-en-1-one

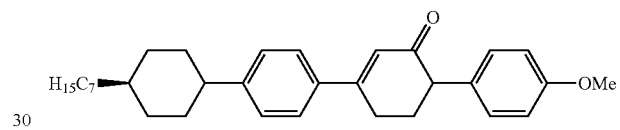

A mixture of 1-(3-dimethylaminopropanoyl)-4-(trans-4-heptylcyclohexylbenzene) hydrochloride (0.167 mol), 4-methoxyphenylacetone (0.17 mol), potassium hydroxide (0.51 mol) and dioxane (250 ml) was refluxed under stirring about five to six hours and, after cooling to room temperature, was treated with a 10% aqueous solution of sulphuric acid. The product was twice extracted with ethyl acetate and after usual procedure the solution was filtered through silica gel and the solvent was removed in vacuo. The residue was recrystallised from isopropanol.

Intermediate 2

4-(trans-4-Heptylcyclohexyl)-3'-chloro-4''-methoxyterphenyl

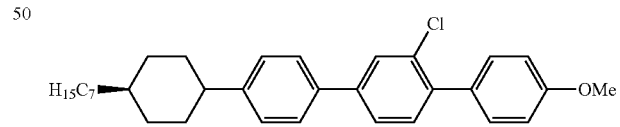

Phosphorous pentachloride (39.3 mmol) was added to the stirred solution of 6-(4-methoxyphenyl)-3-(trans-4-heptylcyclohexylphenyl)cyclohex-2-enone (Intermediate 1, 26.2 mmol) in 150 ml of toluene. The reaction mixture was refluxed under stirring about 5 hours and, after cooling to the room temperature, 100 ml of water were added and the mixture was stirred for one further hour. The reaction mixture was poured into water (about 300 ml) and twice extracted with methylene chloride. The organic layer was dried over magnesium sulphate and filtered through silica gel. The solvent was removed. The obtained product was used for the further transformation without any additional purification.

Intermediate 3

4-(trans-4-Heptylcyclohexyl)-3'-chloro-4"-hydroxyterphenyl

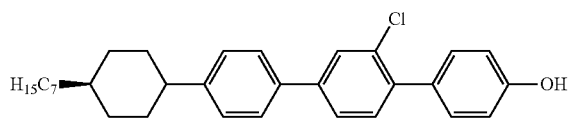

4-(trans-4-heptylcyclohexyl)-3'-chloro-4"-methoxyterphenyl of Intermediate 2 was mixed with 100 ml of acetic acid and 5 ml of 59% aqueous hydroiodic acid. The mixture was refluxed about twelve hours, cooled down to room temperature and poured into water. The product was twice extracted with methylene chloride. The combined organic layers were washed by diluted solution of sodium thiosulphate, water and dried over magnesium sulphate. After removing the solvent, the product was recrystallised from toluene-heptane mixture.

Intermediate 4

4-Decyl-3"-methyl-4'''-methoxyquaterphenyl

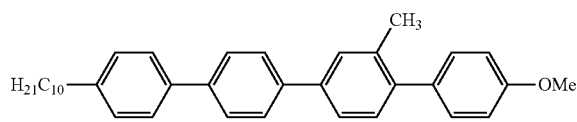

A solution of 6-(4-methoxyphenyl)-3-(4-decylbiphenyl)cyclohex-2-enone (33 mmol) in 80 ml of THF was treated under stirring with ethereal solution of methyl magnesium iodide prepared from 1.6 g (66 mmol) of magnesium. The reaction mixture was stirred for three hours at 35° C. and then kept overnight. After usual acidic treatment the ethereal solution of the corresponding diene was obtained. The ether was then distilled off and replaced with toluene. Air was passed through the diene solution under reflux during five hours for the oxidation to the corresponding aromatic compound. After cooling to room temperature the solution was filtered through silica gel and toluene was distilled off in vacuo. The obtained product was used for the further transformation without any additional purification.

Intermediate 5

4-Decyl-3"-methyl-4'''-hydroxyquaterphenyl

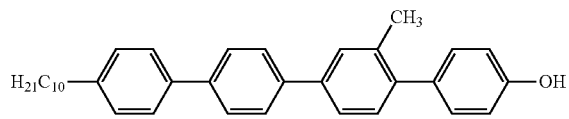

4-decyl-3"-methyl-4'''-methoxyquaterphenyl of Intermediate 4 was mixed with 100 ml of acetic acid and 5 ml of 59% aqueous hydroiodic acid. The mixture was refluxed for twelve hours, cooled down to room temperature and poured into water. The product was twice extracted with methylene chloride. The combined organic layers were washed by diluted solution of sodium thiosulphate, water and dried over magnesium sulphate. After removing the solvent, the product was recrystallised from toluene-heptane mixture.

Example 1

S-4-(trans-4-heptylcyclohexyl)-3'-chloro-4"-(1-methylheptyloxy)terphenyl

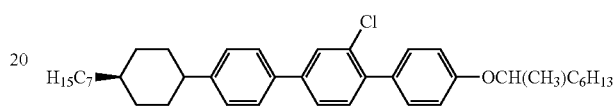

Diisopropyl azodicarboxylate (3.76 mmol) was added during ten to fifteen minutes to the stirred mixture of 3'-chloro-4"-hydroxy-4-(trans-4-heptylcyclohexyl)terphenyl of Intermediate 3 (3.26 mmol), R-2-octanol (3.76 mmol) and triphenylphosphine (3.76 mmol) in 20 ml of THF at a temperature between 5° C. and 10° C. The mixture was allowed to stir overnight at room temperature. THF was then distilled out in vacuo and the residue was several times washed with hexane to extract the desired product. The product was purified by flash chromatography on aluminum oxide (hexane-ethyl acetate, 50:1) followed by the crystallisation from 2-propanol. The yield was 57%.

Example 2

S-4-Decyl-3"-methyl-4'''-(1-methylpentyloxy)quaterphenyl

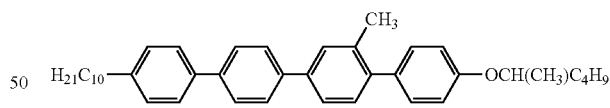

Diisopropyl azodicarboxylate (5.01 mmol) was added during ten to fifteen minutes to the stirred mixture of 4-decyl-3"-methyl-4'''-hydroxyquaterphenyl of Intermediate 5 (4.41 mmol), R-2-hexanol (5.01 mmol) and triphenylphosphine (5.0 mmol) in 25 ml of THF at a temperature of from 5° C. to 10° C. The mixture was allowed to stir overnight at room temperature. THF was then distilled out in vacuo and residue was several times washed with a hexane-ethyl acetate (50:1) mixture to extract the desired product. The product was purified by flash chromatography on aluminum oxide (hexane-ethyl acetate 50:1) followed by crystallisation from acetone. The yield was 63%.

Example 3

S-4-Nonyl-3'-fluoro-4'''-(2-chloropropyloxy)quaterphenyl

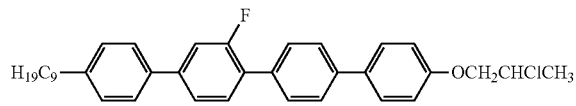

This compound was synthesised by the reaction of the corresponding hydroxy quaterphenyl with R-(−)-2-chloropropanol. The yield was 55%.

The following compounds were synthesised using the similar transformation and the transformations presented on schemes 1 and 2.

Example 4

Butyl S-2-[4-octyl-2'-fluoro-3'''-trifluoromethyl-4'''-quaterphenyloxy]-propionate

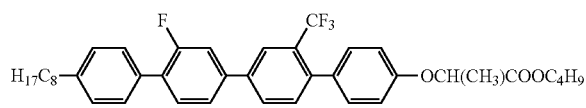

Example 5

R-4-Octyl-3'''-chloro-4'''-(1-methylhexyloxy)quaterphenyl

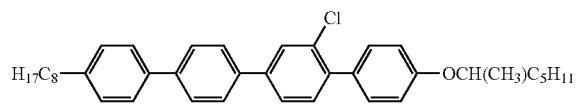

Example 6

Comparative

R-4-(trans-4-Heptylcyclohexyl)-3'-Methoxy-4''-(1-trifluoromethylheptyl-oxycarbonyl)terphenyl

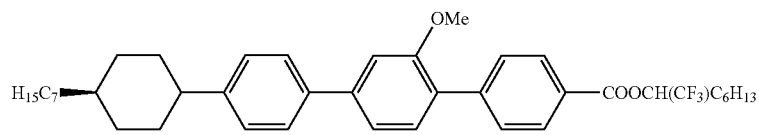

Example 7

Comparative

R-4-(4-Nonyl-2-trifluoromethyllcyclohex-1-enyl)-3'-Chloro-4''-(1-methylheptyloxy)terphenyl

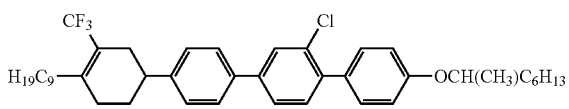

Example 8

Comparative

S-2-[4-(2-Fluorohexyloxy)biphenyl-4']-5-(trans-4-hexylcyclohexyl)-fluorocyclohex-1-ene

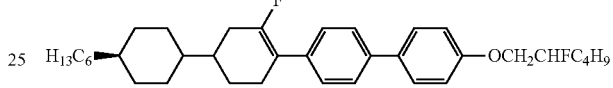

Example 9

S-2-[2'-Methyl-4''-(1-methylheptyloxy)terphenyl-4]-5-heptylpyridine

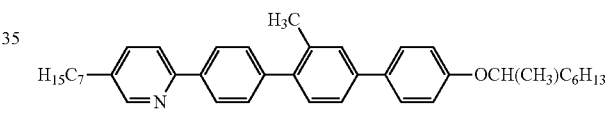

Example 10

S-2-[2-fluoro-4''-(1-methylheptyloxy)terphenyl-4]-5-octylpyrimidine

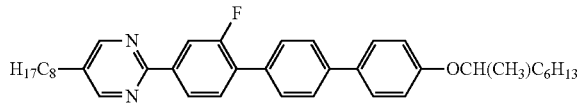

These compounds and other pyridine and pyrimidine derivatives were prepared by the cross-coupling reaction of the substituted bromo(iodo)pyridines or pyrimidines with corresponding arylboronic acids.

The transformations presented on schemes 1 and 2 and the cross-coupling reaction were used also for the synthesis of the following five ring compounds.

Example 11

S-4-Nonyl-3',2''-difluoro-3'''-chloro-4''''-(1-methyl-heptyloxy)penta-phenyl

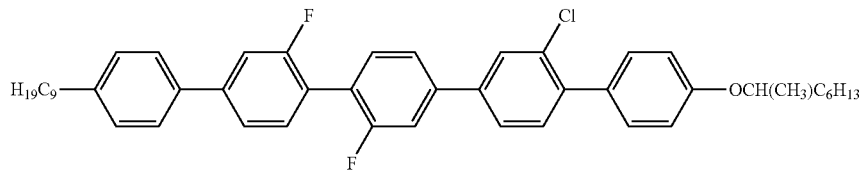

Example 12

Comparative

S-4-(trans-4-Octylcyclohexyl)-3,3''-dichloro-4'''-(1-methylpentyloxy)-quaterphenyl

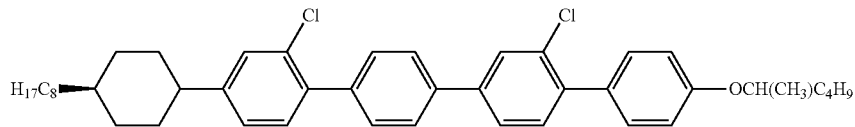

Example 13

Comparative

S-2-[4-(1-Methylheptyloxy)-3'-chloroterphenyl-4'']-5-(trans-4-heptylcyclohexyl)-1-trifluoromethylcyclohex-1-ene

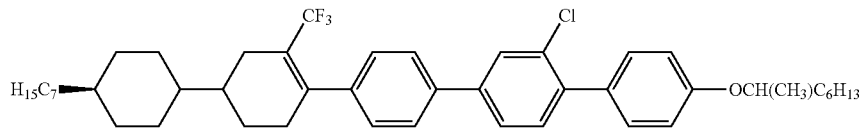

Example 14

R-2-[2-fluoro-4''-(1-methylheptyloxy)terphenyl-4]-5-octylpyrimidine

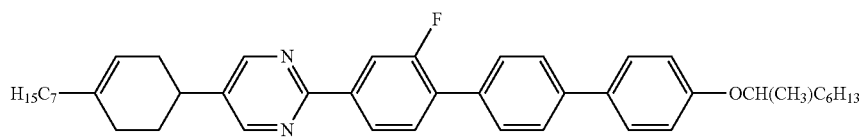

The compounds 1.1-1.19 and the compounds presented in the tables 1 and 2 were synthesised using the similar trans formations of the corresponding 3,6-disubstituted cyclohex-2-enones.

TABLE 1

Transition temperatures of the compounds $$H_{2n+1}C_n-\text{[biphenyl]}-\text{[phenyl-X]}-\text{[phenyl]}-OR'$$

Transition temperatures in °C.

| N | X | R' | Cr | | Sm C* | | Sm A | | N | | I |
|---|---|---|---|---|---|---|---|---|---|---|---|
| 6 | Cl | CH(CH₃)CH₂F | • | 88.7 | — | | • | 203 | • | | 215.7 • |
| 6 | Cl | CH(CH₃)COOCH(CH₃)CH₂OCH₃ | • | 58.8 | — | | • | 144.8 | • | | 147.6 • |
| 6 | Cl | CH(CH₃)COOCH₂CHClCH₂CH(CH₃)₂ | • | 59.1 | — | | • | | — | | 107.8 • |
| 6 | Cl | CH(CH₃)C₅H₁₁ R (−) | • | 50.2 | • | 98.8 | • | | — | | 165.2 • |
| 6 | Cl | CH(CH₃)C₆H₁₃ R (−) | • | 44.7 | • | 85.4 | • | | — | | 158.6 • |
| 6 | Cl | CH(CH₃)COOCH₃ | • | 96.7 | — | | • | | — | | 178.6 • |
| 6 | Cl | CH(CH₃)COOR* | • | 39.2 | — | | • | 116.3 | • | | 139.3 • |
| 7 | Cl | CH(CH₃)C₆H₁₃ R (−) | • | 42.2 | • | 85.1 | • | | — | | 157.7 • |
| 7 | Cl | CH(CH₃)C₆H₁₃ S (+) | • | 40.2 | • | 83.4 | • | | — | | 157.6 • |
| 8 | Cl | OCCHClCH₃ | • | 90.0 | •(**) | | — | 233 | • | | 239 • |
| 8 | F | CH(CH₃)C₆H₁₃ S (+) | • | 152 | — | | • | | — | | 155.7 • |
| 8 | CH₃ | CH(CH₃)C₆H₁₃ | • | 32.1 | • | 105.6 | • | | — | | 142.8 • |
| 8 | Cl | CH(CH₃)COOCH₃ S (+) | • | 81 | • | 107.5 | • | | — | | 175.0 • |
| 8 | Cl | CH(CH₃)COOC₂H₅ S (+) | • | 43 | • | 95.6 | • | | — | | 149 • |
| 8 | Cl | CH(CH₃)CH₂OCH₃ S (+) | • | 61.3 | • | 114.8 | • | 168.6 | • | | 172.2 • |
| 8 | Cl | CH(CH₃)CH₂OC₃H₇ S (+) | • | 38.9 | • | 115.3 | • | 155.7 | • | | 160.0 • |
| 8 | Cl | CH(CH₃)CH₂OOCCHClCH₃ | • | 43 | • | 78.0 | • | | — | | 142.5 • |
| 8 | Cl | CH(CH₃)CH₂OOCTHF(*) | • | 40 | •() | 78.0 | — | | — | | 143.0 • |
| 8 | Cl | CH(CH₃)CH₂OPhCOOCH(CH₃)C₆H₁₃ | • | 58.0 | •(**) | 72.0 | • | 141.0 | • | | 198.0 • |
| 10 | CH₃ | CH(CH₃)C₆H₁₃ R (−) | • | 48.6 | • | 126.8 | • | | — | | 149.8 • |
| 10 | Cl | CH(CH₃)C₆H₁₃ R (−) | • | 42.3 | • | 130.2 | • | | — | | 148.1 • |

R(*) = CH(CH₃)C₆H₁₃,
•(**)-Sm B,
THF(***)-tetrahydrofuran ring

TABLE 2

Transition temperatures of the compounds $$H_{2n+1}Cn-\text{[cyclohexyl]}-\text{[phenyl]}-\text{[phenyl-X]}-\text{[phenyl]}-OR'$$

Transition temperatures in °C.

| n | X | R' | Cr | | Sm C* | Sm A | | N | | I |
|---|---|---|---|---|---|---|---|---|---|---|
| 7 | Cl | CH(CH₃)C₆H₁₃ R (−) | • | <20 | — | • | | — | 135.7 | • |
| 7 | CH₃ | CH(CH₃)C₆H₁₃ R(−) | • | 28 | — | • | 127.3 | • | 132.8 | • |
| 7 | Cl | CH₂CHClCH₃ | • | 88 | — | • | 175 | • | 203.0 | • |
| 7 | Cl | CH(CH₃)COOC₂H₅ L(−) | • | 72 | — | • | 134.5 | • | 140 | • |

Example 15

Comparative

Ferroelectric LC mixture A-1 of the following composition has been prepared:

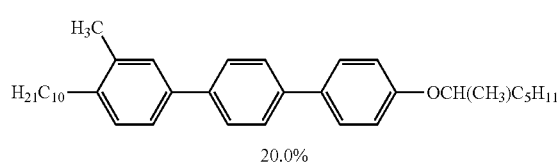

20.0%

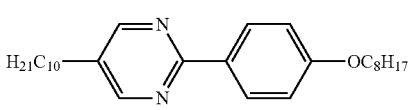

31.6%

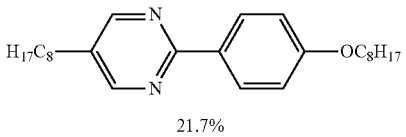

21.7%

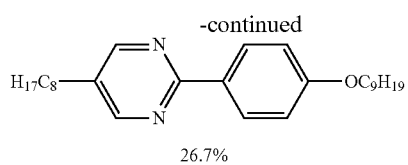

26.7%

Transition temperatures: Cr −6.3° C. SmC* 514° C. SmA 68.1° C. I

Example 16

Comparative

Ferroelectric LC mixture A-2 of the following composition has been prepared:

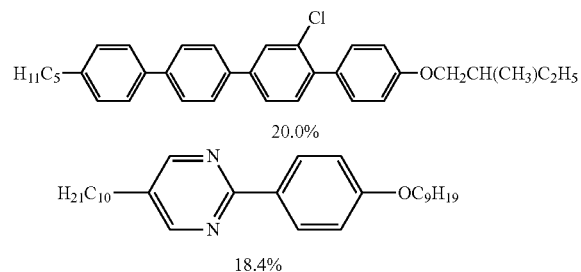

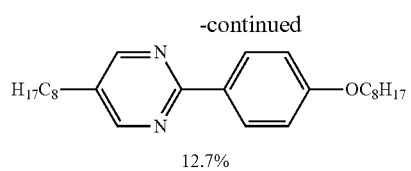

12.7%

21.3%

27.6%

Transition temperatures: Cr 7.3° C. SmC* 67.7° C. SmA 74.2° C. I

Example 17

Comparative

Ferroelectric LC mixture B-1 of the following composition has been prepared:

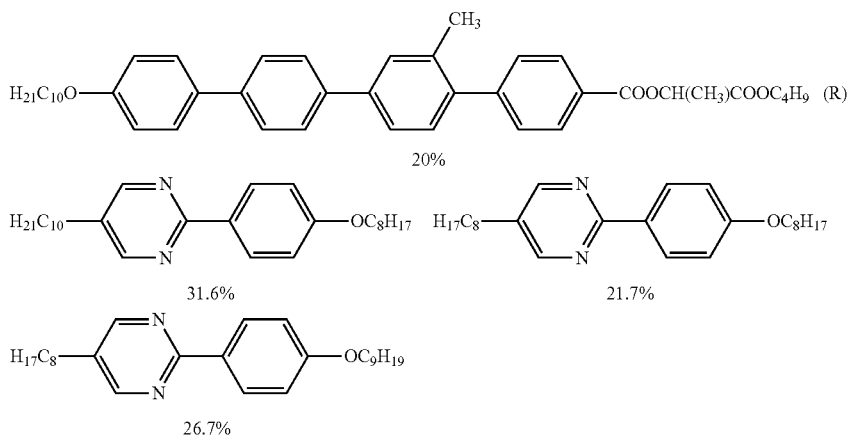

Transition temperatures: Cr 5.6° C. SmC* 54.2° C. SmA 71.1° C. I

Example 18

Comparative

Ferroelectric LC mixture B-2 of the following composition has been prepared:

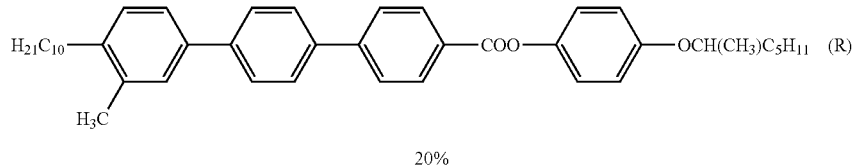

20%

[Structure: H21C10-pyrimidine-C6H4-OC9H19] 18.4%

[Structure: H17C8-pyrimidine-C6H4-OC9H19] 21.3%

[Structure: H17C8-pyrimidine-C6H4-OC8H17] 12.7%

[Structure: H17C8-pyrimidine-biphenyl-OC8H17] 27.6%

Transition temperatures: Cr −7.3° C. SmC* 85.0° C. SmA 109.3° C. N 114.0° C. I

Example 19

Comparative

Ferroelectric LC mixture A-3 of the following composition has been prepared:

[Structure: H5C2CH(CH3)CH2CH2CH2-biphenyl-difluorophenyl-C5H11] 20.0%

[Structure: H21C10-pyrimidine-C6H4-OC8H17] 31.6%

[Structure: H17C8-pyrimidine-C6H4-OC8H17] 21.7%

[Structure: H17C8-pyrimidine-C6H4-OC9H19] 26.7%

Transition temperatures: Cr 9.5° C. SmC* 50.4° C. SmA 61.3° C. I

Example 20

Comparative

Ferroelectric LC mixture A-4 of the following composition has been prepared:

[Structure: H5C2CH(CH3)CH2-cyclohexyl-phenyl-fluorophenyl-cyclohexyl-C5H11] 20.0%

[Structure: H21C10-pyrimidine-C6H4-OC9H19] 18.4%

[Structure: H17C8-pyrimidine-C6H4-OC8H17] 12.7%

[Structure: H17C8-pyrimidine-C6H4-OC9H19] 21.3%

[Structure: H17C8-pyrimidine-biphenyl-OC8H17] 27.6%

Transition temperatures: Cr 11.2° C. SmC* 61.4° C. SmA 79.1° C. I

Example 21

Comparative

Ferroelectric LC mixture B-3 of the following composition has been prepared:

[Structure: H11C5-cyclohexyl(NC)-phenyl-phenyl-phenyl-C6H13] 20.0%

[Structure: H21C10-pyrimidine-C6H4-OC8H17] 31.6%

[Structure: H17C8-pyrimidine-C6H4-OC8H17] 21.7%

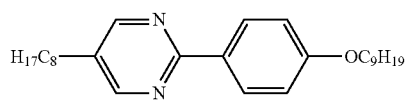

26.7%

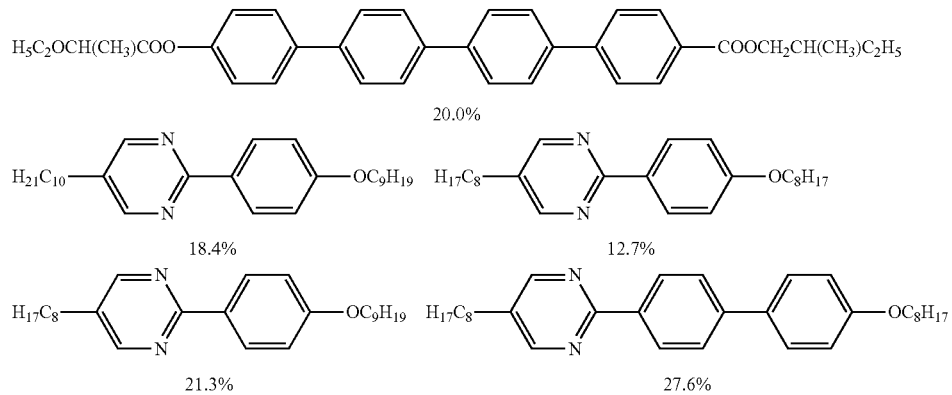

Transition temperatures: Cr 8.3° C. SmC* 56.1° C. SmA 71.1° C. I

Example 22

Comparative

Ferroelectric LC mixture B-4 of the following composition has been prepared:

20.0%

18.4%   12.7%

21.3%   27.6%

Transition temperatures: Cr 15.5° C. SmC* 63.1° C. SmA 94.7° C. I

Example 23

Ferroelectric LC mixture C-1 of the following composition has been prepared

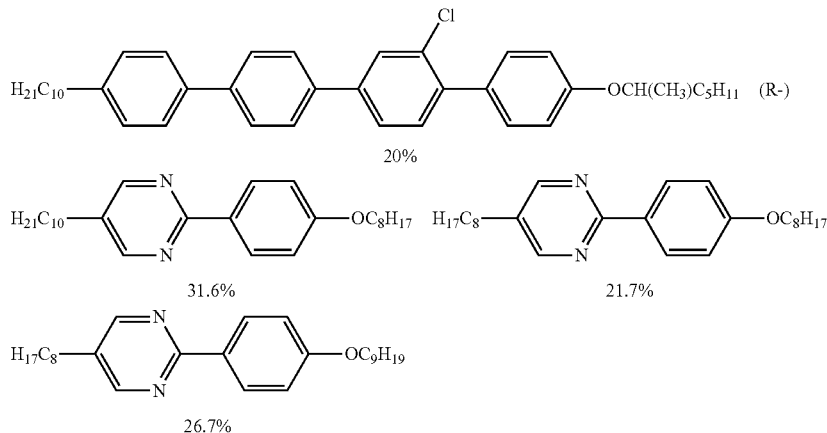

20%

31.6%   21.7%

26.7%

Transition temperatures: Cr −23.4° C. SmC* 65.7° C. SmA 81.2° C.

Example 24

Ferroelectric LC mixture C-2 of the following composition has been prepared:

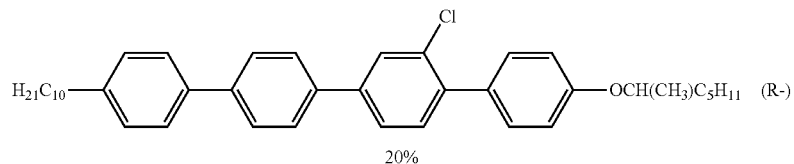

20%

-continued
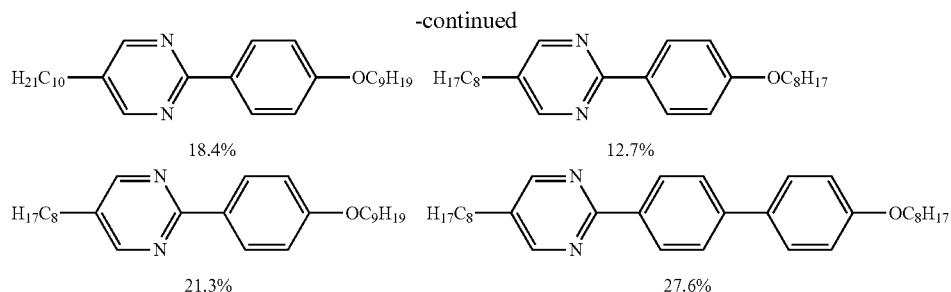
Transition temperatures: Cr −15.7° C. SmC* 89.5° C. SmA 109.5° C. 113.0° C. I
Example 25
Ferroelectric LC mixture D-1 of the following composition has been prepared:
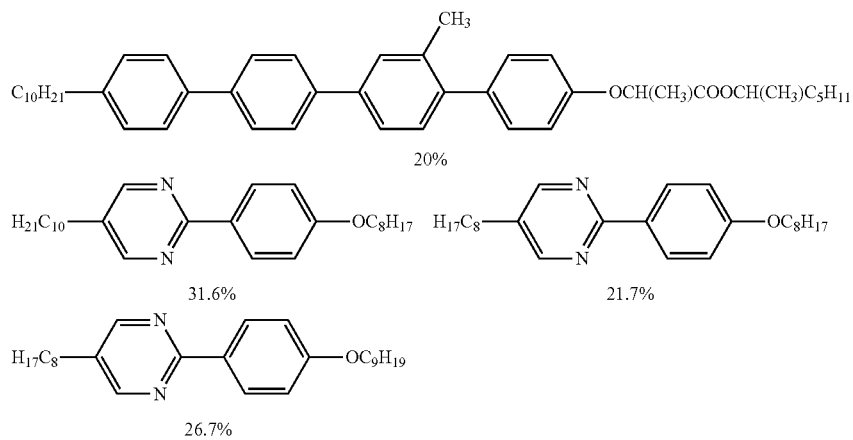
Transition temperatures: Cr −17.1° C. SmC* 59.3° C. SmA 71.5° C. I
Example 26
Ferroelectric LC mixture D-2 of the following composition has been prepared:
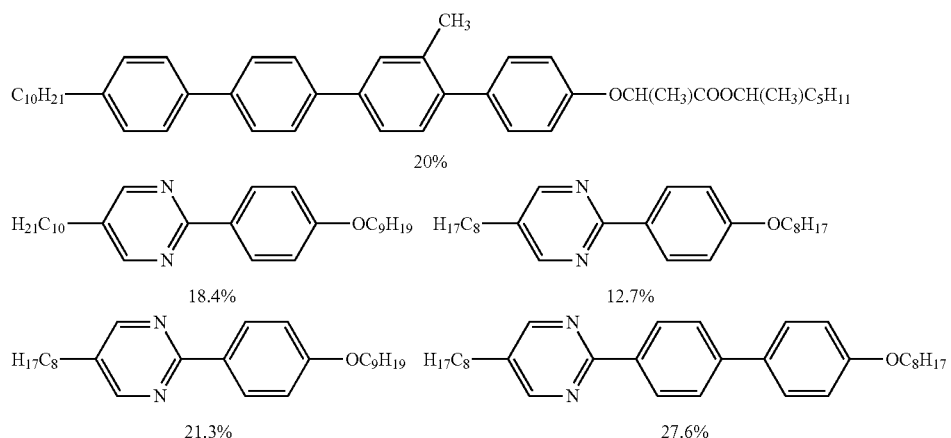

Transition temperatures: Cr −9.7° C. SmC* 79.4° C. SmA 89.0° C. 100.0° C. I

The investigations of the ferroelectric mixtures containing known chiral compounds (mixtures A-1,2; B-1,2) and the chiral compounds according to the present invention (mixtures C-1,2; D-1,2) have shown that the chiral materials and mixtures comprising these, and display cells comprising such mixtures, according to the present invention, possess a wide temperature range of the SmC*-phase and a very good thermal and mechanical stability (see table 3). Prepared results have shown that the mechanical shock (in our experiments the thickness of the cells was decreased from 3.5 μm until 1.3 μm, up to 60% of its original width under the mechanical pressure) does not cause irreversible alignment destruction of FLC cells according to the present invention in comparison with the cells containing FLC mixtures (mixtures A-1,2; B-1,2) based upon known chiral compounds. We did not find any changes in alignment conditions after dozens of very serious tests. All the cells have the same alignment quality, contrast and are defect-free after mechanical pressure and mechanical shock, when the cells were dropped on a flat surface from a height of 30 cm.

TABLE 3

Dependence of the contrast ratio of the FLC cells from the mechanical pressure*

| Mixtures | Cell gap in μm | Operating field strength in V/μm | SmC* range temperatures in ° C. | Geometrical deviation in % | Contrast ratio |
|---|---|---|---|---|---|
| 1 | 2 | 3 | 4 | 5 | 6 |
| A-1 | 2.8 | 10 | −6.3 to +52.4 | 0 | 1:50 |
|  |  |  |  | 10 | 1:20 |
|  |  |  |  | 20 | 1:10 |
|  |  |  |  | 30 | 1:5 |
|  |  |  |  | 40 | 1:3 |
|  |  |  |  | 50 | 1:2 |
|  |  |  |  | 60 | 1:2 |
| A-2 | 2.7 | 10 | 7.3 to +67.7 | 0 | 1:32 |
|  |  |  |  | 10 | 1:25 |
|  |  |  |  | 20 | 1:12 |
|  |  |  |  | 30 | 1:2 |
|  |  |  |  | 40 | 1:2 |
|  |  |  |  | 50 | 1:2 |
|  |  |  |  | 60 | 1:2 |
| B-1 | 2.9 | 10 | 5.6 to +54.2 | 0 | 1:64 |
|  |  |  |  | 10 | 1:25 |
|  |  |  |  | 20 | 1:10 |
|  |  |  |  | 30 | 1:2 |
|  |  |  |  | 40 | 1:2 |
|  |  |  |  | 50 | 1:2 |
|  |  |  |  | 60 | 1:2 |
| B-2 | 2.8 | 10 | −7.3 to +85.0 | 0 | 1:115 |
|  |  |  |  | 10 | 1:115 |
|  |  |  |  | 20 | 1:115 |
|  |  |  |  | 30 | 1:100 |
|  |  |  |  | 40 | 1:75 |
|  |  |  |  | 50 | 1:35 |
|  |  |  |  | 60 | 1:20 |
| A-3 | 2.7 | 10 | 9.5 to +50.4 | 0 | 1:40 |
|  |  |  |  | 10 | 1:25 |
|  |  |  |  | 20 | 1:15 |
|  |  |  |  | 30 | 1:3 |
|  |  |  |  | 40 | 1:2 |
|  |  |  |  | 50 | 1:2 |
|  |  |  |  | 60 | 1:2 |
| A-4 | 2.9 | 10 | 11.2 to +61.4 | 0 | 1:45 |
|  |  |  |  | 10 | 1:25 |
|  |  |  |  | 20 | 1:10 |
|  |  |  |  | 30 | 1:2 |
|  |  |  |  | 40 | 1:2 |
|  |  |  |  | 50 | 1:2 |
|  |  |  |  | 60 | 1:2 |
| B-3 | 2.8 | 10 | 8.3 to +56.1 | 0 | 1:40 |
|  |  |  |  | 10 | 1:25 |
|  |  |  |  | 20 | 1:5 |
|  |  |  |  | 30 | 1:2 |
|  |  |  |  | 40 | 1:2 |
|  |  |  |  | 50 | 1:2 |
|  |  |  |  | 60 | 1:2 |
| B-4 | 2.8 | 10 | 15.5 to +63.1 | 0 | 1:70 |
|  |  |  |  | 10 | 1:65 |
|  |  |  |  | 20 | 1:45 |
|  |  |  |  | 30 | 1:35 |
|  |  |  |  | 40 | 1:25 |
|  |  |  |  | 50 | 1:25 |
|  |  |  |  | 60 | 1:10 |
| C-1 | 2.8 | 10 | −23.4 to +65.7 | 0 | 1:170 |
|  |  |  |  | 10 | 1:170 |
|  |  |  |  | 20 | 1:170 |
|  |  |  |  | 30 | 1:170 |
|  |  |  |  | 40 | 1:170 |
|  |  |  |  | 50 | 1:170 |
|  |  |  |  | 60 | 1:140 |
| C-2 | 2.8 | 10 | −15.7 to +89.5 | 0 | 1:210 |
|  |  |  |  | 10 | 1:210 |
|  |  |  |  | 20 | 1:210 |
|  |  |  |  | 30 | 1:210 |
|  |  |  |  | 40 | 1:210 |
|  |  |  |  | 50 | 1:210 |
|  |  |  |  | 60 | 1:210 |
| D-1 | 2.8 | 10 | −17.1 to +59.3 | 0 | 1:140 |
|  |  |  |  | 10 | 1:140 |
|  |  |  |  | 20 | 1:140 |
|  |  |  |  | 30 | 1:140 |
|  |  |  |  | 40 | 1:120 |
|  |  |  |  | 50 | 1:100 |
|  |  |  |  | 60 | 1:70 |
| D-2 | 2.8 | 10 | −9.7 to +79.4 | 0 | 1:140 |
|  |  |  |  | 10 | 1:140 |
|  |  |  |  | 20 | 1:140 |
|  |  |  |  | 30 | 1:140 |
|  |  |  |  | 40 | 1:125 |
|  |  |  |  | 50 | 1:110 |
|  |  |  |  | 60 | 1:90 |

*The measurements of the electrooptic parameters of the mixtures were performed at room temperature (22.5° C.)

Example 27

Ferroelectric LC mixture C-2.2 of the following composition has been prepared:

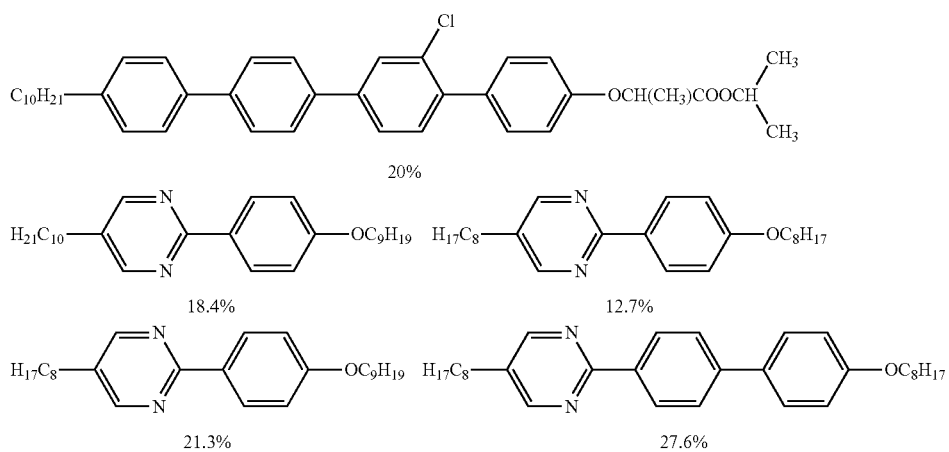

Transition temperatures: Cr −15.3° C. SmC* 69.2° C. SmA 90.1° C. I

The investigations of the electro-optical and dynamic parameters of the FLC mixtures based upon the invented (C-2.2) and known (A-2) compounds have shown that the new ferroelectric LCDs are characterised by a lower operating voltage, fast response time ($t_{on}$–$t_{off}$), high contrast ratio—more than 300:1 and have a wide temperature range of the ferroelectric LC phase (Table 4).

The new mode (effect) monostable or bistable chiral nematic LCDs according to the present invention were made with parallel, antiparallel or twisted rubbing directions on two alignment layers of the cells. Commercial polyamides, nylons and other polymer materials were used as alignment layers. The cells with different gaps (from 1.5 μm up to 20 μm) were filled with the chiral nematic materials of the present invention. The corresponding driving wave forms were used to switch and to get monostable or bistable states.

TABLE 4

Physical parameters of FLC mixtures*

| Mixture | SmC* range temperature in ° C. | $P_s$ in nC/cm² | Tilt angle | Birefringence | Operating field strength in V/μm | $t_{on}$ in μs | $t_{off}$ in μs |
|---|---|---|---|---|---|---|---|
| A-2 | 7.3 to +67.7 | 12.3 | 21.7 | 0.24 | 2 | 290 | 615 |
|  |  |  |  |  | 4 | 190 | 310 |
|  |  |  |  |  | 6 | 148 | 205 |
|  |  |  |  |  | 8 | 93 | 136 |
|  |  |  |  |  | 10 | 47 | 108 |
| C-2.2 | −15.3 to +69.2 | 24.5 | 28.3 | 0.27 | 2 | 180 | 320 |
|  |  |  |  |  | 4 | 78 | 150 |
|  |  |  |  |  | 6 | 53 | 102 |
|  |  |  |  |  | 8 | 35 | 74 |
|  |  |  |  |  | 10 | 22 | 48 |

*The measurements of the electrooptic parameters of the mixtures were performed at room temperature (22.5° C.)

These types of displays have many advantages over other display technologies and can be widely used in future.

Electro-optical studies were performed in the glass cells supplied with ITO electrodes (with the resistivity 150 Ω/cm²) and SiO₂ insulating layers 170 nm thick. Commercial aligning layers (nylon 6, or AL-1254, or PL-3001) were spinned and parallelly or unidirectionally rubbed. The thickness of the cells (from 1.5 μm up to 30 μm) was measured in each case interferometrically. During the electro-optical measurements the temperature of the cells was controlled with an accuracy ±0.3° C. and the gradients across the sample did not exceed 1° C. Response time ($t_{on}$ and $t_{off}$) was measured when the transmission was changed from 10% to 90% correspondingly.

The new cholesteric (or chiral nematic) mixtures according to the invention were prepared by blending of the compounds of formula (1) with the different nematic liquid crystal compounds.

The new cholesteric materials have a temperature range of the chiral nematic phase from −30° C. up to +100° C., and the helical pitch is from 10 nm up to 300 μm.

The detailed parameters of the chiral nematic cells are listed in the next examples and tables 5 to 9.

Example 28

Comparative

Nematic mixture M-1 of the following composition has been prepared:

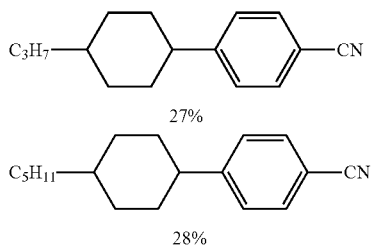

-continued
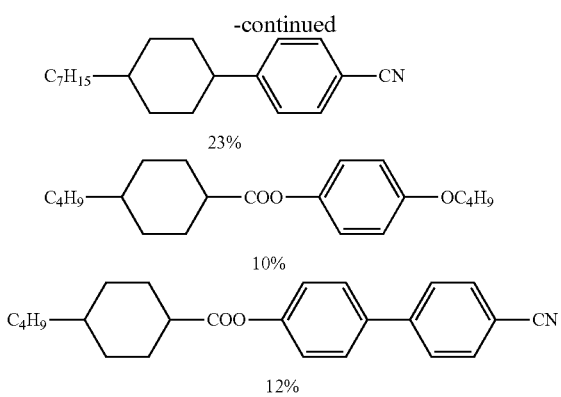
Example 29
Comparative
Nematic mixture M-3 of the following composition has been prepared:
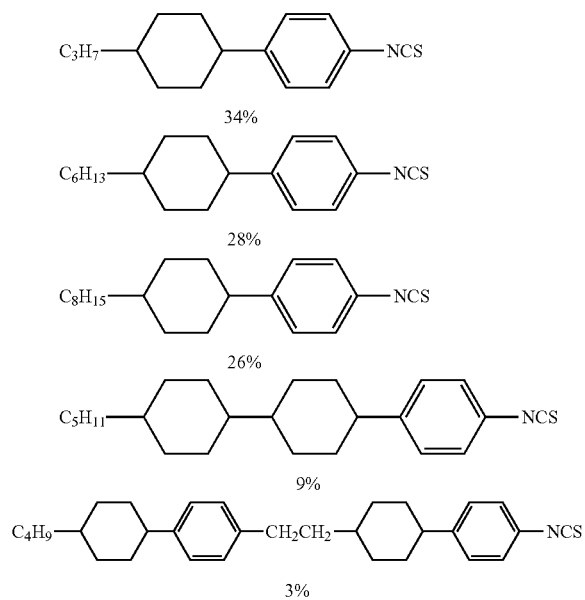
Example 30
Comparative
A cholesteric mixture M-1.1 of the following composition has been prepared:
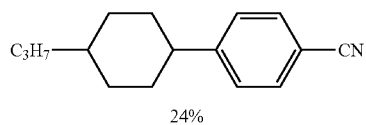
-continued
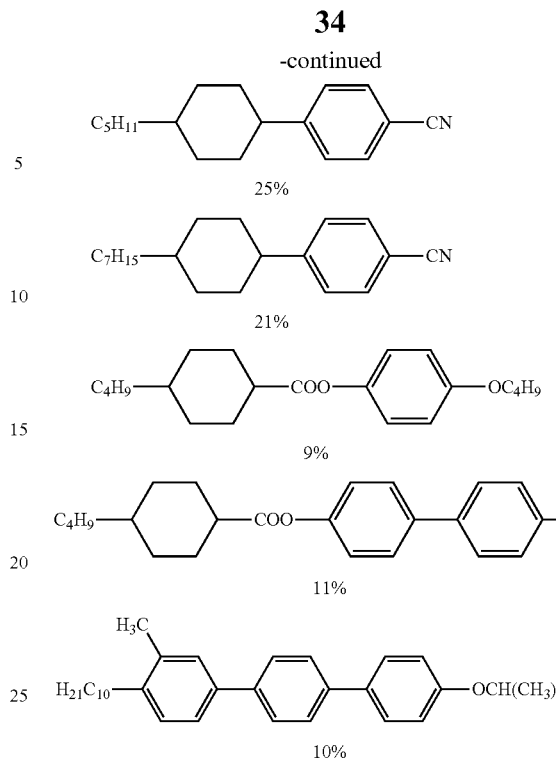
Example 31
A cholesteric mixture M-1.2 of the following composition has been prepared:
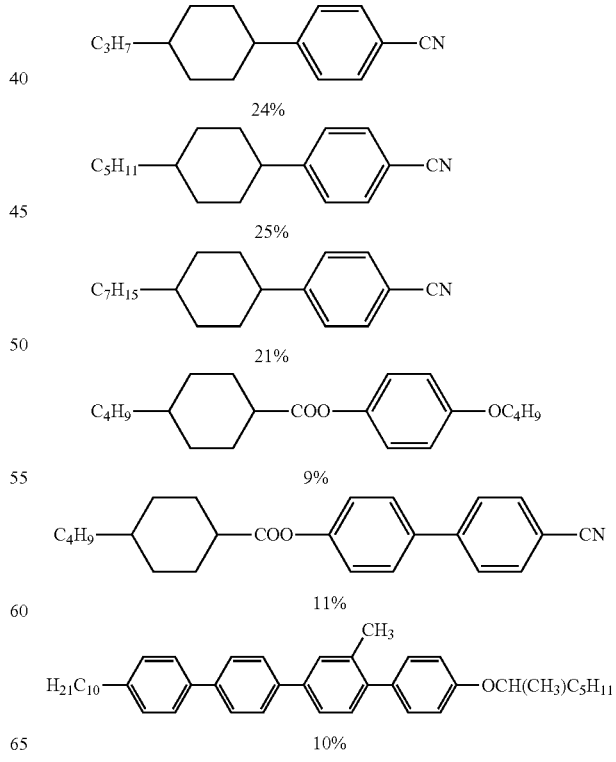

Example 32

Comparative

A cholesteric mixture M-2.1 of the following composition has been prepared:

Commercial "Merck" mixture MLC-6657-100

90%

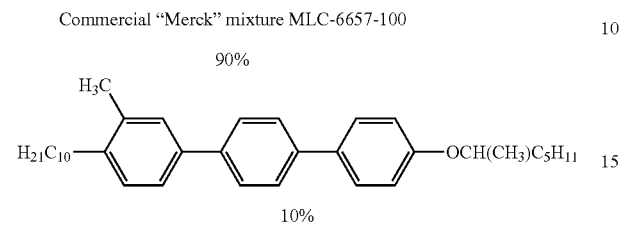

10%

Example 33

A cholesteric mixture M-2.2 of the following composition has been prepared:

MLC-6657-100

90%

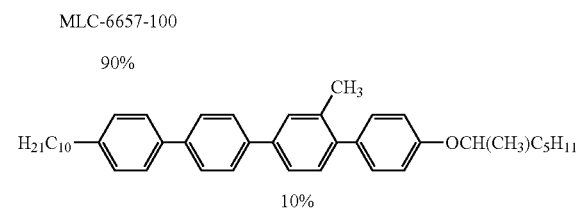

10%

Example 34

Comparative

A cholesteric mixture M-3.1 of the following composition has been prepared:

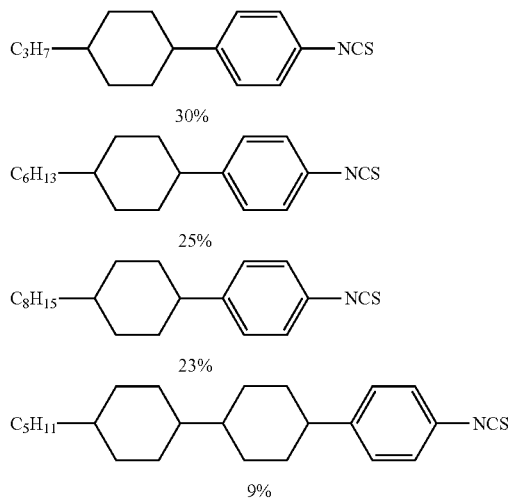

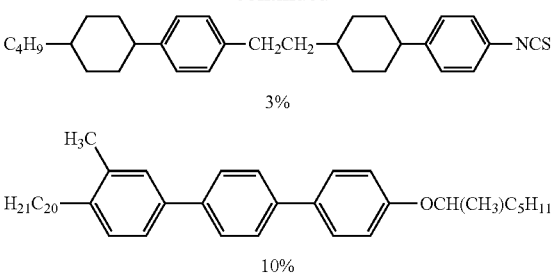

3%

10%

Example 35

A cholesteric mixture M-3.2 of the following composition has been prepared:

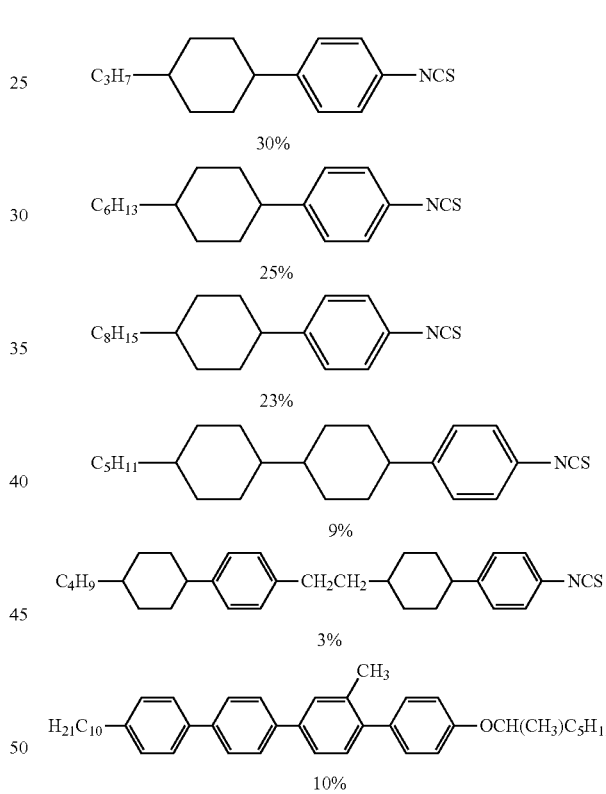

10%

The investigations of the nematic (mixtures M-1, commercial mixture "MLC-6657-100" as obtained from Merck, M-3) and cholesteric mixtures containing known chiral compounds (mixtures M-1.1; M-2.1, M-3.1) and the chiral compounds according to the present invention (mixtures M1.2, M-2.2, M-3.2) have shown that the compositions according to the present invention are characterised by very fast response time $t_{on}$ and $t_{off}$ of less than 1.0 ms (see table 5), in comparison with the cholesteric materials (mixtures M-1.1; M-2.1, M-3.1) based upon known chiral compounds. The fastest response time $t_{on}$ and $t_{off}$ of these materials is only about 20 ms.

TABLE 5

Response time ($t_{on}$ and $t_{off}$) of nematic and chiral nematic mixtures*

| | | | | Mixture | | | | | |
|---|---|---|---|---|---|---|---|---|---|
| | M-1 | M-1.1 | M-1.2 | MLC-6657-100 | M-2.1 | M-2.2 | M-3 | M-3.1 | M-3.2 |
| Cell gap d/μm | 4.07 | 4.06 | 4.08 | 4.1 | 4.11 | 4.1 | 4.05 | 4.09 | 4.1 |
| $t_{on}$/ms | 12.3 | 13.2 | 1.3 | 3.4 | 4.6 | 0.35 | 3.8 | 4.7 | 0.16 |
| $t_{off}$/ms | 25.6 | 28.4 | 4.2 | 13.6 | 17.3 | 7 | 12.2 | 14.8 | 0.8 |

*The measurements of the electrooptic parameters of the mixtures were performed at room temperature (22.5° C.)

Example 36

Comparative

A cholesteric mixture M-1.3 of the following composition has been prepared:

$C_3H_7$—[cyclohexyl]—[phenyl]—CN

26%

$C_5H_{11}$—[cyclohexyl]—[phenyl]—CN

27%

$C_7H_{15}$—[cyclohexyl]—[phenyl]—CN

22%

$C_4H_9$—[cyclohexyl]—COO—[phenyl]—$OC_4H_9$

9%

$C_4H_9$—[cyclohexyl]—COO—[phenyl]—[phenyl]—CN

11%

$H_{21}C_{10}$—[phenyl($H_3C$)]—[phenyl]—[phenyl]—$OCH(CH_3)C_5H_{11}$

5%

Example 37

A cholesteric mixture M-1.4 of the following composition has been prepared:

$C_3H_7$—[cyclohexyl]—[phenyl]—CN

26%

$C_5H_{11}$—[cyclohexyl]—[phenyl]—CN

27%

$C_7H_{15}$—[cyclohexyl]—[phenyl]—CN

22%

$C_4H_9$—[cyclohexyl]—COO—[phenyl]—$OC_4H_9$

9%

$C_4H_9$—[cyclohexyl]—COO—[phenyl]—[phenyl]—CN

11%

$H_{13}C_6$—[phenyl]—[phenyl($CH_3$)]—[phenyl]—[phenyl]—$OCH(CH_3)C_5H_{11}$

5%

Example 38

Comparative

A cholesteric mixture M-2.3 of the following composition has been prepared:

MLC-6657-100

95%

$H_{21}C_{10}$—[phenyl($H_3C$)]—[phenyl]—[phenyl]—$OCH(CH_3)C_5H_{11}$

5%

Example 39

A cholesteric mixture M-2.4 of the following composition has been prepared:

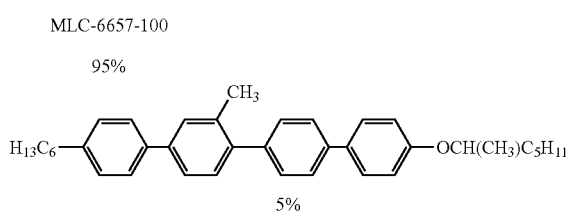

Example 40

Comparative

A cholesteric mixture M-3.3 of the following composition has been prepared:

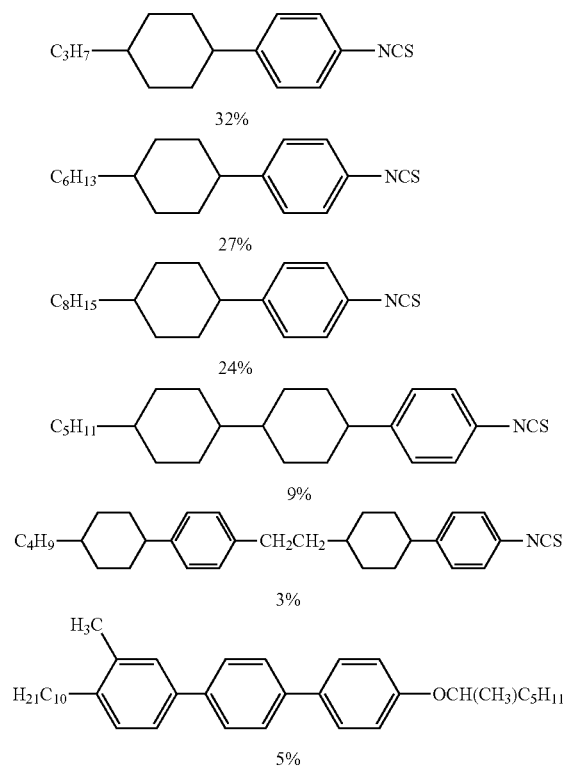

Example 41

A cholesteric mixture M-3.4 of the following composition has been prepared:

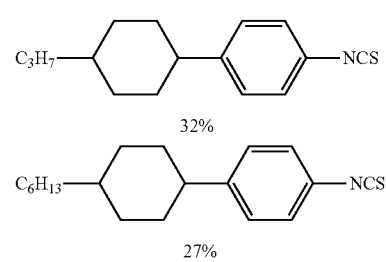

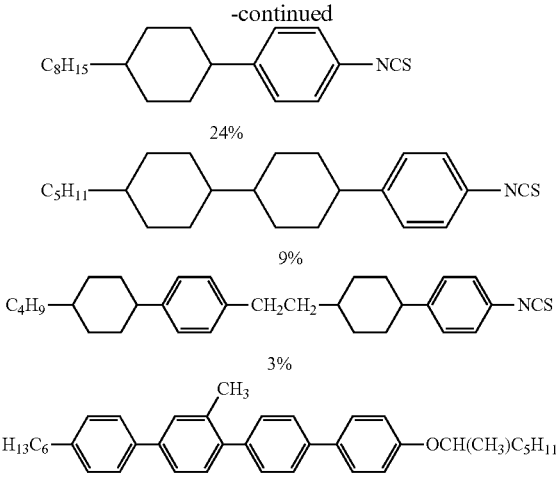

The investigations of the cholesteric mixtures containing known chiral compounds (mixtures M-1.3; M-2.3, M-3.3) and the chiral compounds according to the present invention (mixtures M1.4, M-2.4, M-3.4) have shown that the compositions according to the present invention are characterised by very good sharpness of the electro-optical curve and, at the same time, fast response time ($t_{on}+t_{off}$) (see table 6) in comparison with the cholesteric materials (mixtures M-1.1; M-2.1, M-3.1) based upon known chiral compounds and the known chiral nematic materials for STN displays.

These types of materials have advantages over other material and can be widely used in the production of LCDs with multiplex driving scheme having, for example, duty ratio 1:64.

TABLE 6

Sharpness and the response time ($t_{on}$ and $t_{off}$) of the chiral nematic mixtures*

| | Mixture | | | | | |
|---|---|---|---|---|---|---|
| | M-1.3 | M-1.4 | M-2.3 | M-2.4 | M-3.3 | M-3.4 |
| Cell gap d/μm | 5.12 | 5.08 | 5.11 | 5.1 | 5.09 | 5.1 |
| $t_{on}$/ms | 101 | 35 | 89 | 32 | 82 | 17 |
| $t_{off}$/ms | 148 | 43 | 122 | 38 | 105 | 22 |
| $V_{th}$/V | 1.94 | 1.87 | 2.17 | 2.10 | 1.8 | 1.65 |
| $V_{st}$/V | 2.24 | 2.1 | 2.49 | 2.34 | 2.04 | 1.8 |
| Sharpness | 0.154 | 0.124 | 0.147 | 0.114 | 0.133 | 0.091 |

*The measurements of the electrooptic parameters of the mixtures were performed at room temperature (22.5° C.)

Example 42

Comparative

A cholesteric mixture M-2.5 of the following composition has been prepared:

MLC-6657-100

85%

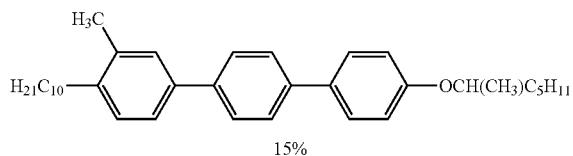
15%
Example 43
A cholesteric mixture M-2.6 of the following composition has been prepared:
MLC-6657-100
85%
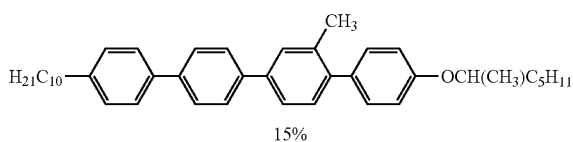
15%
Example 44
Comparative
A cholesteric mixture M-3.5 of the following composition has been prepared:
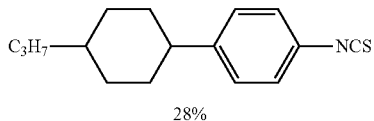
28%
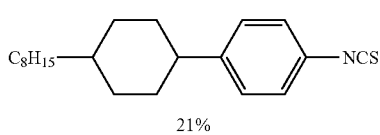
24%
C$_8$H$_{15}$—⬡—⬢—NCS
21%
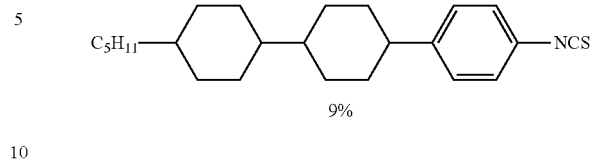
9%
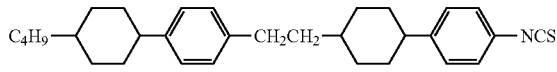
3%
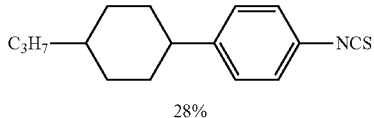
15%
Example 45
Chiral nematic mixture M-3.6 of the following composition has been prepared:
C$_3$H$_7$—⬡—⬢—NCS
28%
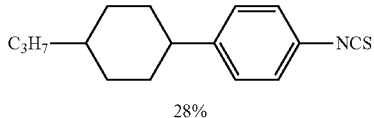
24%
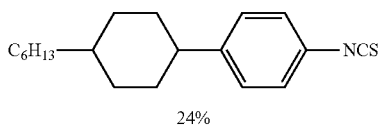
21%
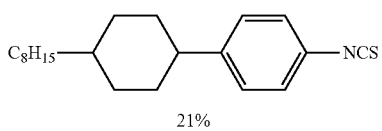
9%
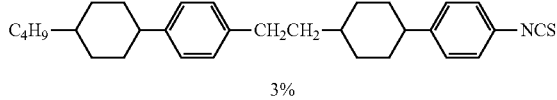
3%

-continued

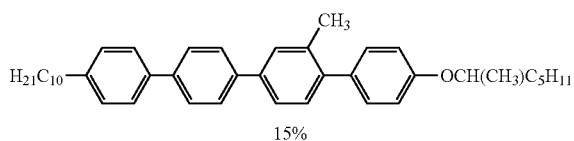

15%

The investigations of the nematic (mixtures MLC-6657-100, M-3) and the chiral nematic mixtures containing known chiral compounds (mixtures M-2.5, M-3.5) and the chiral compounds according to the present invention (mixtures M-2.6, M-3.6) have shown that the invented compositions are characterised by excellent bistability (stable image memory during long period) and, at the same time, very fast response time $t_{on}$ and $t_{off}$ (see table 7) in comparison with the cholesteric materials (mixtures M-2.5, M-3.5) based upon known chiral compounds.

These types of materials have advantages over other material and can be widely used in future. Once displayed, the information is memorised for a long time, ranging from seconds up to years, depending on the application needs. This intrinsic memory is the main advantage of the bistable devices. It enables to lower the power consumption; especially, when the application does not require a frequent update. For some mobile applications, e-book for instance, the energy saving can be a decisive improvement, increasing the battery lifetime by orders of magnitude.

The additional investigations of the nematic (mixture M-3) and the cholesteric mixtures containing the chiral compounds according to the present invention (mixtures M-3.6) have shown (see table 8), that the response time $t_{on}$ and $t_{off}$ of the compositions according to the present invention are not depending so strongly upon the thickness of the cell in comparison with the nematic materials (mixture M-3).

TABLE 7

Bistability and the response time ($t_{on}$ and $t_{off}$) of the nematic and cholesteric mixtures*

| | Mixture | | | | | |
|---|---|---|---|---|---|---|
| | MLC-6657-100 | M-2.5 | M-2.6 | M-3 | M-3.5 | M-3.6 |
| Cell gap d/μm | 4.2 | 4.17 | 4.18 | 4.18 | 4.19 | 4.19 |
| $t_{on}$/ms | 3.6 | 17 | 0.42 | 3.9 | 14 | 0.28 |

TABLE 7-continued

Bistability and the response time ($t_{on}$ and $t_{off}$) of the nematic and cholesteric mixtures*

| | Mixture | | | | | |
|---|---|---|---|---|---|---|
| | MLC-6657-100 | M-2.5 | M-2.6 | M-3 | M-3.5 | M-3.6 |
| $t_{off}$/ms | 13.8 | 35 | 6.9 | 11.7 | 26 | 2.9 |
| Bistability** | no | Poor | excellent | no | poor | excellent |

*The measurements of the electrooptic parameters of the mixtures were performed at room temperature (22.5° C.)
**Rating of bistability: poor—image memory during one minute or less, excellent—stable image memory during long period (more than two weeks)

TABLE 8

Dependence of the response time ($t_{on}$ and $t_{off}$) of the nematic and chiral nematic mixtures from the cell gap*

| | Mixture | | | | | | | | | |
|---|---|---|---|---|---|---|---|---|---|---|
| | M-3 | | | | | M-3.6 | | | | |
| Cell gap d/μm | 3.5 | 4.2 | 5.2 | 6.2 | 7.2 | 3.5 | 4.2 | 5.2 | 6.2 | 7.2 |
| $t_{on}$/ms | 2.9 | 3.9 | 5.8 | 8.4 | 11.2 | 0.26 | 0.28 | 0.33 | 0.41 | 0.52 |
| $t_{off}$/ms | 9.3 | 11.7 | 16.8 | 24.8 | 32.7 | 2.7 | 2.9 | 3.2 | 3.8 | 4.6 |

*The measurements of the electrooptic parameters of the mixtures were performed at room temperature (22.5° C.)

Example 46

Comparative

A cholesteric mixture M-1.5 of the following composition has been prepared:

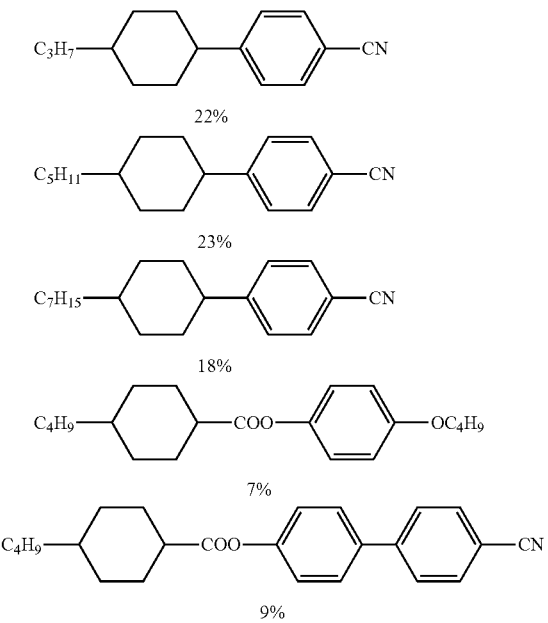

-continued

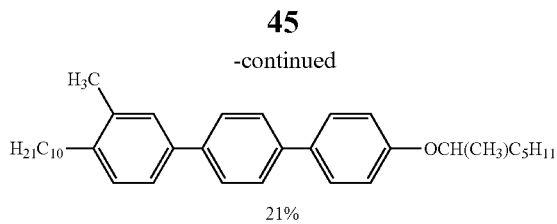

21%

Example 47

Comparative

A cholesteric mixture M-1.6 of the following composition has been prepared:

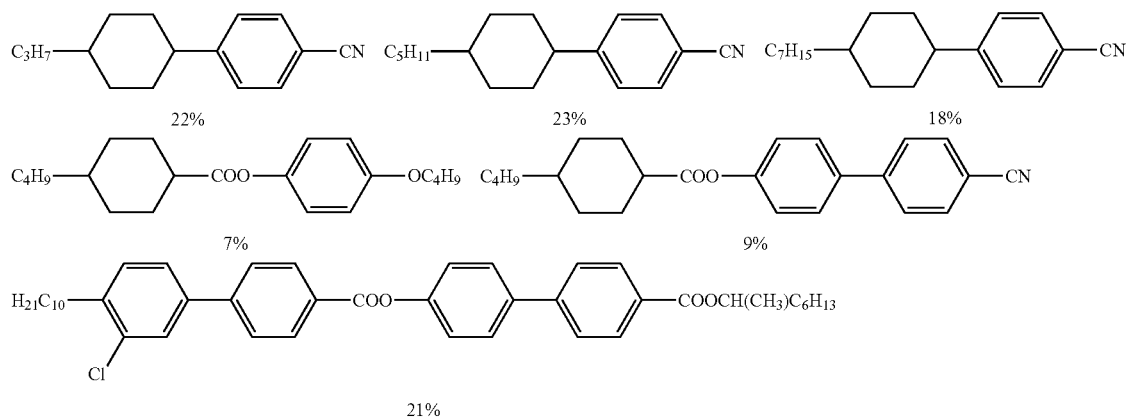

21%

Example 48

A cholesteric mixture M-1.7 of the following composition has been prepared:

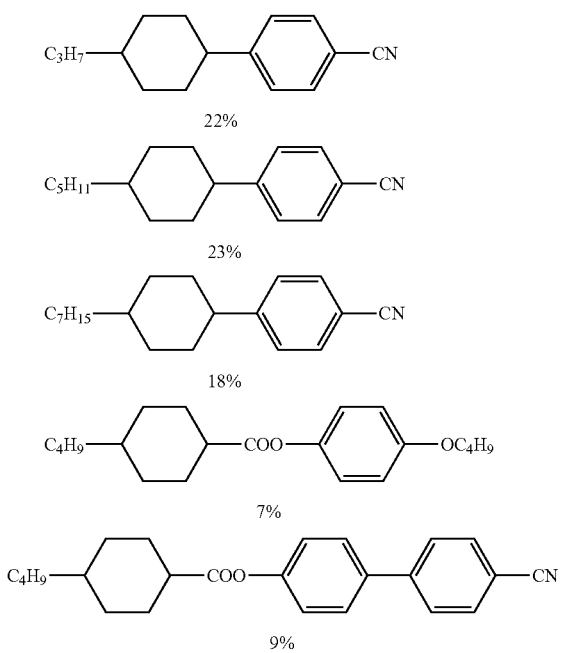

-continued

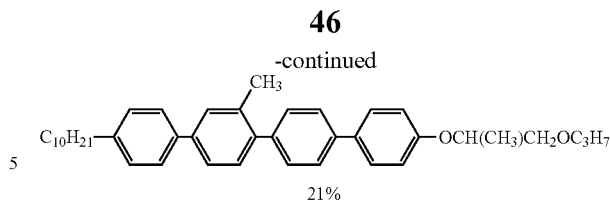

21%

The investigations of the cholesteric mixtures (mixtures M-1.5, M-1.6, M 1.7, see table 9) have shown that the selective reflection cells containing the chiral compositions according to the present invention (mixture M-1.7) have lower operating voltage in comparison with the cells containing the materials based upon the known chiral compounds (mixtures M-1.5, M-1.6)

TABLE 9

| Threshold voltage of the chiral nematic cells* | | | |
|---|---|---|---|
| Mixture | M-1.5 | M-1.6 | M-1.7 |
| Cell gap d/μm | 5.2 | 5.2 | 5.2 |
| $V_{th}$/ V | 48 | 25 | 1.7 |
| reflection wavelength in nm | 580 | 540 | 540 |

*The measurements of the electrooptic parameters of the mixtures were performed at room temperature (22.5° C.)

Liquid crystal compounds of formula (1) according to the present invention make it possible to create chiral nematic mixtures with different values of a helical pitch and an optical anisotropy (Δn), a positive or negative dielectric anisotropy (Δ∈), a needed value of the elastic constants (especially $K_{22}$) and a wide temperature range of the chiral nematic phase. The mixtures allow in combination with alignment materials to create the new mode (effect) fast switching, low operating voltage monostable or bistable cholesteric LCDs with passive matrix (static or multiplexing) or active matrix (TFT) addressing.

These types of displays, especially due to the fast switching, low operating voltage and bistability, have many advantages over other display technologies and can be widely used in future. The intrinsic memory is the main advantage of the bistable devices. It enables to the low power consumption, especially when the application does not require a frequent update. For some mobile application the energy saving can be a decisive improvement, increasing the battery lifetime by orders of magnitude.

It should be noted that the additional investigations of the chiral compounds presented in WO 96/00710 A1, EP 0 339

414 A2, EP 0 360 042 A1, EP 0 306 195 A2, GB 2 200 912 A, U.S. Pat. No. 7,022,259, U.S. Pat. No. 5,494,605, U.S. Pat. No. 5,382,380, U.S. Pat. No. 5,250,222, U.S. Pat. No. 4,419,264, WO 89/02425 A1, EP 0 329 153 A2, U.S. Pat. No. 5,486,309 A, U.S. Pat. No. 5,358,663 A and U.S. Pat. No. 4,780,241 have shown that these compounds, in contrast to the compounds of formula (I), do not have a rigid rod shape central core of the molecules and do not form the smectic C phase in the overall temperature range of from 10° C. to 154° C. Investigations have shown that these compounds cannot be used for the preparation of cholesteric liquid crystal mixtures with a wide temperature range of the cholesteric phase (from −30° C. up to 100° C.), good dynamic parameters (with a response time of less than 5 ms or 10 ms), low threshold and saturation voltages (less than 20 V), good sharpness of the electro-optical curve, and good mechanical, thermal and long-term stability of bistable textures, and of ferroelectric liquid crystal mixtures with different values of the optical anisotropy (Δn) and the spontaneous polarisation, or chiral nematic mixtures with different values of a helical pitch and an optical anisotropy (Δn), a positive or negative dielectric anisotropy (Δ∈), a needed value of the elastic constants (especially $K_{22}$) and a wide temperature range of the ferroelectric or cholesteric phases.

The compounds and liquid crystal mixtures of WO 96/00710 A1, EP 0 339 414 A2, EP 0 360 042 A1, EP 0 306 195 A2, GB 2 200 912 A, U.S. Pat. No. 7,022,259, U.S. Pat. No. 5,494,605, U.S. Pat. No. 5,382,380, U.S. Pat. No. 5,250,222, U.S. Pat. No. 4,419,264, WO 89/02425 A1, EP 0 329 153 A2, U.S. Pat. No. 5,486,309 A, U.S. Pat. No. 5,358,663 A and U.S. Pat. No. 4,780,241 do not allow in combination with alignment materials to create the shock-stable ferroelectric liquid crystal displays LCDs with low operating voltage and high contrast ratio, or fast switching, low operating voltage monostable or bistable chiral nematic LCDs.

The invention claimed is:
1. A chiral liquid crystal compound of the general formula (1):

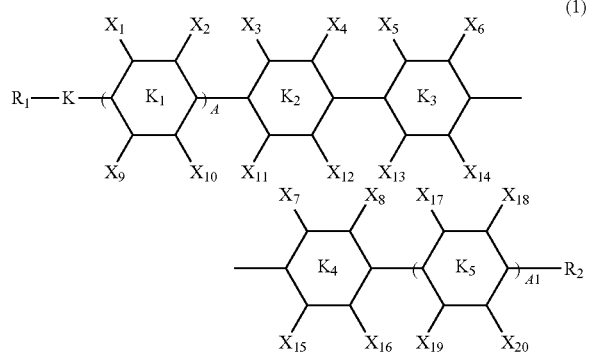

in which
$R_1 = Y—(CH_2)_n—(O)_m—(CH_2)_k—(O)_l—(CH_2)_p—$, or
$Y—(CH_2)_n—CH=CH—(CH_2)_p—(O)_m—$, or
$Y—(CH_2)_n—CHY_1—(O)_m—(CH_2)_k—(O)_l—CHY_2—(CH_2)_p—Y_3$, or
$Y—(CH_2)_n—CHY_1—(O)_m—(CH_2)_k—(O)_l—(CH_2)_p—Y_3$, or fluorinated alkyl or fluorinated alkoxy groups where the fluorinated alkyl or fluorinated alkoxy group has from 1 to 20 carbon atoms;
$R_2 = Y_3—(CH_2)_n—CHY_4—(O)_m—(CH_2)_k—(O)_l—CHY_5—(CH_2)_p—Y$, or
$Y_3—(CH_2)_n—(O)_m—(CH_2)_k—(O)_l—CHY_5—(CH_2)_p—Y$, where
$R_2$ is a chiral substituent, and $R_1$ is a non-chiral linear or branched alkyl residue having from 6 to 25 carbon atoms, and where Y denotes, in each occurrence, and independently of each other, one of the atoms H, F, and Cl, or one of the groups —CN, —S—CN, —O—CF$_3$, —CF$_3$, —CO—CH$_3$, —C$_i$H$_{2i+1}$, —O—C$_i$CH$_{2i+1}$, —CO—O—C$_i$CH$_{2i+1}$, or —O—CO—C$_i$H$_{2i+1}$;

$Y_1$ and $Y_2$ denote, in each occurrence, and independently of each other, one of the atoms F and Cl or one of the groups —CN, —CF$_3$, —C$_j$H$_{2j+1}$, —CO—O—C$_j$H$_{2j+1}$, —O—CO—C$_j$H$_{2j+1}$ or nonsimultaneously the atom H, or simultaneously the atom H;

$Y_3$ denotes in each occurrence, and independently of each other, one of a single bond or the atom —O—, $Y_4$ and $Y_5$ denote, in each occurrence, and independently of each other, one of the atoms F, Cl or one of the groups —CN, —CF$_3$, —C$_h$H$_{2h+1}$, —O—C$_h$H$_{2h+1}$, —CO—O—C$_h$H$_{2h+1}$, —O—CO—C$_h$H$_{2h+1}$ or nonsimultaneously the atom H;

n, p, k, j, i, h each assume values, independently for each of n, p, k, j, i, and h, from 0 to 7;

m and l independently denote 0 or 1; and if l=m=0, then i+k+n+p is at least 6 with the proviso that Y, $Y_1$, $Y_2$, $Y_3$, $Y_4$, $Y_5$, h, i, j, k, l, m, n, and p are chosen such that $R_2$ is a chiral substituent having at least one center of chirality, K denotes a single bond or a six-membered ring system selected from the group consisting of cyclohexane, cyclohexene, benzene, pyridine, pyrimidine, tetrazine, 1,3,2-dioxaborinane, hexahydropyridine, hexahydropyrimidine, hexahydropyridazine, hexahydropyrazine, the isomers of hexahydrotriazine, tetrahydrooxazine, cyclobutane, cyclopentane, cycloheptane, and cyclooctane rings, and from at least partially unsaturated ring compounds derived from any of these ring compounds, wherein the number of atoms in these rings or ring systems between the two atoms forming a part of the chemical bond to the next ring, or to the substituent $R_1$ does not differ by more than one if counted in the clockwise, and if counted in the counter-clockwise sense, starting from the same atom in each case;

where A and $A_1$ assume value 0 or 1, and in the case when K is single bond, only one of A and $A_1$ is 0, $K_{1-5}$ independently of each other denote each a six-membered ring system selected from the group consisting of benzene, pyridine, pyrimidine, tetrazine, 1,3,2-dioxaborinane, hexahydropyridine, hexahydropyrimidine, hexahydropyridazine, hexahydropyrazine, the isomers of hexahydrotriazine, tetrahydrooxazine, and of the at least partially unsaturated ring compounds derived from any of these ring compounds, $X_{1-20}$ denote, independently of each other, alkyl, or alkoxy, or fluorinated alkyl, or fluorinated alkoxy groups, or the atom H, or one of the halogen atoms, or one of the alkyl, alkoxy, fluorinated alkyl, and fluorinated alkoxy groups having, in each case independently of each other, from 1 to 20 carbon atoms, wherein the outer of the consecutive rings, (the rings that carry the substituents $R_1$ and $R_2$, respectively), do not carry substituents in the 2, 3, 5, and 6 positions and wherein at least three consecutive rings of the rings from $K_1$, $K_2$, $K_3$, $K_4$ and $K_5$ are aromatic or heteroaromatic rings selected independently from each other from the group of rings consisting of benzene, pyridine, pyrimidine, and tetrazine, consecutive rings meaning rings that are directly bonded to each other, with one atom which is a member of the one ring being directly bonded to one atom which is a member of the next ring.

2. The chiral liquid crystal compound of claim 1, wherein:

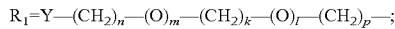

n assumes values from 3 to 7
K denotes a single bond,
A=1,
$K_{1-5}$ denote, independently from each other, a benzene, or pyridine, or pyrimidine ring
$X_{1-20}$ denote, independently from each other, one of the —$CH_3$, —$C_2H_5$, —O—$CH_3$, —$CF_3$, or —O—$CF_3$ groups, or one of the atoms H, F, or Cl.

3. The chiral liquid crystal compound of claim 1, wherein

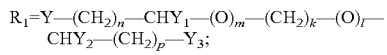

where
K denotes a single bond,
A=1, $A_1$ assumes a value of 0 or 1;
$K_{1-5}$ denote, independently from each other, a benzene, or pyridine, or pyrimidine ring, and
$X_{1-20}$ denote —$CH_3$, or —$C_2H_5$, or —O—$CH_3$, or —$CF_3$, or —O—$CF_3$ groups, or an atom H, or F, or Cl.

4. The chiral liquid crystal compound of claim 1, wherein

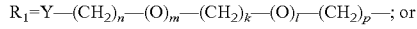

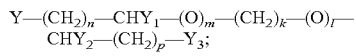

where
K denotes one of benzene, pyridine, pyrimidine, cyclobutane, cyclopentane, cycloheptane, and cyclooctane rings;
where A=1, $A_1$=0;
$K_{1-4}$ denote benzene, or pyridine, or pyrimidine ring, except the case when $K_1$ and $K_3$ are benzene rings;
$X_{1-16}$ denote, independently from each other, one of the groups —$CH_3$, —$C_2H_5$, —O—$CH_3$, —$CF_3$, or —O—$CF_3$, or one of the atoms H, F, or Cl.

5. The chiral liquid crystal compound of claim 1, wherein

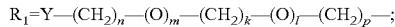

where
n assumes values of from 3 to 7
K denotes a single bond
A=1, $A_1$=0;
$K_{1-5}$ denote, independently from each other, a benzene, or pyridine, or pyrimidine ring;
$X_{1-16}$ denote, independently from each other, an atom H and not more than seven of $X_{1-16}$ may be halogen atoms, or —$CH_3$, or —$CF_3$ groups.

6. The chiral liquid crystal compound of claim 1, wherein at least three consecutive rings in formula 1 are phenylene rings which are connected in the 1- and 4-positions to the adjacent ring or bond.

7. The chiral liquid crystal compound of claim 1, wherein at least four consecutive rings in formula 1 are phenylene rings which are connected in the 1- and 4-positions to the adjacent ring or bond.

8. The chiral liquid crystal compound of claim 6, which have four or five phenylene rings each connected in the 1- and 4-positions.

9. The chiral liquid crystal compound of claim 6, wherein the alkyl residue $R_1$ is directly connected with one of its carbon atoms to the outer phenylene ring in the para position.

10. The chiral liquid crystal compound of claim 6, wherein in a number of g consecutive rings, the rings being referred to as K, $K_1$, $K_2$, $K_3$, ..., $K_{g-1}$, for any ring $K_f$ where f can assume values from 0 in which case $K_f$=K, 1 in which case $K_f$=$K_1$, 2 in which case $K_f$=$K_2$, etc., up to g–1 in which case $K_f$=$K_{g-1}$, if two rings $K_{f1}$ and $K_{f2}$ with f2>f1 bear a substituent in the 2, 3, 5, or 6 position, there is no ring $K_f$ with f2>f>f1 which does not also bear at least one substituent in the 2, 3, 5, or 6 position.

11. The chiral liquid crystal compound of claim 6 wherein the at least one chiral centre in the group $R_2$ is separated from the ring $K_4$ or $K_5$ by one ether bond —O— or a non-chiral alkylene group —$CY_6Y_6$—, or a non-chiral group of the formula —O—$CY_6Y_6$—, or a group of the formula —$CH_2$—$CY_6Y_6$—, or a non-chiral group of the formula —$CY_6Y_6$—$CH_2$—, or a non-chiral group of the formula —O—$CY_6Y_6$—$CH_2$— where $Y_6$ may be H, F, Cl, —CN, CF3, —$C_qH_{2q+1}$, —O—$C_qH_{2q+1}$, —CO—O—$C_qH_{2q+1}$, where q can be from 1 to 11.

12. A liquid crystal mixture containing at least two compounds, comprising a mass fraction of from 0.5% up to 99.5% of at least one or more dielectric organic compounds and a mass fraction of from 99.5% to 0.5% of the chiral liquid crystal compound according to claim 1.

13. A liquid crystal mixture containing at least two compounds, having ferroelectric properties, and comprising as dielectric organic compound, a mass fraction of from 5% to 90% of at least one non-chiral or chiral smectic compound, and a mass fraction of from 10% to 95% of at least one chiral liquid crystal compound according to claim 1.

14. A liquid crystal mixture containing at least two compounds and comprising as dielectric organic compound, a mass fraction of from 30% to 70% of at least one non-chiral or chiral smectic compound, and a mass fraction of from 70% to 30% of at least one chiral liquid crystal compound according to claim 1.

15. A liquid crystal mixture containing at least two compounds, having chiral nematic properties, and comprising as dielectric organic compound, a mass fraction of from 50% to 99.5% of at least one compound which is neither chiral nor chiral nematic, and a mass fraction of from 0.5% to 50% of at least one chiral liquid crystal compound according to claim 1.

16. The liquid crystal mixture of claim 15, wherein the mass fraction of the at least one compound which is neither chiral nor chiral nematic is from 70% to 99.5%, and the at least one compound which is neither chiral nor chiral nematic has a positive dielectric anisotropy, and wherein the mass fraction of the at least one chiral liquid crystal compound is from 30% to 0.5%.

17. The liquid crystal mixture of claim 16, wherein the mass fraction of the at least one compound which is neither chiral nor chiral nematic is from 70% to 99.5%, and the at least one compound which is neither chiral nor chiral nematic has a negative dielectric anisotropy, and wherein the mass fraction of the at least one chiral liquid crystal compound is from 30% to 0.5%.

18. The liquid crystal mixture of claim 12, containing at least three compounds, wherein the mass fraction of the at least one chiral liquid crystal compound according is from 0.5% to 50%, and wherein at least two dielectric organic compounds are present, wherein the sum of the mass fractions of such compounds is from 50% to 99.5%, and at least one of such compounds is neither chiral nor chiral nematic, and at least one of such compounds is a smectic compound.

19. A liquid crystal display with passive matrix (static or multiplexing) addressing containing the liquid crystal mixture according to claim 1.

20. A liquid crystal display with active matrix (TFT) addressing containing the liquid crystal mixture according to claim 12.

21. A ferroelectric liquid crystal display with passive matrix (static or multiplexing) addressing containing the liquid crystal mixture according to claim 13.

22. A ferroelectric liquid crystal display with active matrix (TFT) addressing containing the liquid crystal mixture according to claim 13.

23. A bistable ferroelectric liquid crystal display containing the liquid crystal mixture according to claim 13.

24. A cholesteric liquid crystal display with passive matrix (static or multiplexing) addressing containing the liquid crystal mixture according to claim 15.

25. A cholesteric liquid crystal display with active matrix (TFT) addressing, containing the liquid crystal mixture according to claim 15.

26. A bistable cholesteric liquid crystal display containing the liquid crystal mixture according to claim 15.

27. A selective reflection cholesteric liquid crystal display containing the liquid crystal mixture according to claim 15.

* * * * *